(12) United States Patent
Henriksson et al.

(10) Patent No.: US 9,752,279 B2
(45) Date of Patent: Sep. 5, 2017

(54) INTEGRATED METHOD AND SYSTEM FOR RECYCLING WASTE MATERIAL

(71) Applicant: Georgia-Pacific Containerboard LLC, Atlanta, GA (US)

(72) Inventors: David Christer Henriksson, Marietta, GA (US); Wayne Frederick Winkler, DePere, WI (US); Bradley E. Lucas, Menasha, WI (US); Paul Topping, Smyma, GA (US)

(73) Assignee: GEORGIA-PACIFIC CONTAINERBOARD LLC, Atlanta, GA (US)

( * ) Notice: Subject to any disclaimer, the term of this patent is extended or adjusted under 35 U.S.C. 154(b) by 0 days.

(21) Appl. No.: 14/861,551

(22) Filed: Sep. 22, 2015

(65) Prior Publication Data

US 2016/0097158 A1    Apr. 7, 2016

Related U.S. Application Data

(60) Provisional application No. 62/060,150, filed on Oct. 6, 2014.

(51) Int. Cl.
| | |
|---|---|
| *D21F 1/00* | (2006.01) |
| *D21C 7/00* | (2006.01) |
| *D21B 1/02* | (2006.01) |
| *D21C 5/02* | (2006.01) |

(52) U.S. Cl.
CPC .......... *D21C 7/00* (2013.01); *D21B 1/02* (2013.01); *D21C 5/02* (2013.01); *Y02W 30/648* (2015.05)

(58) Field of Classification Search
USPC ...................................... 162/190
See application file for complete search history.

(56) References Cited

U.S. PATENT DOCUMENTS

| | | | |
|---|---|---|---|
| 3,873,410 | A | 3/1975 | Chupka |
| 5,137,599 | A | 8/1992 | Maxham |
| 5,424,033 | A | 6/1995 | Roland |
| 6,458,240 | B1 | 10/2002 | Bouchette et al. |
| 6,730,223 | B1 | 5/2004 | Anderson et al. |
| 7,745,208 | B2 | 6/2010 | Noll |
| 8,800,898 | B2 | 8/2014 | Alford |
| 8,834,809 | B2 | 9/2014 | Michalek et al. |
| 9,156,069 | B2 | 10/2015 | Toll et al. |
| 2002/0096269 | A1 | 7/2002 | Bouchette et al. |
| 2006/0011314 | A1 | 1/2006 | Hertl et al. |
| 2010/0003548 | A1 | 1/2010 | Hall |
| 2011/0008865 | A1 | 1/2011 | Lee |
| 2012/0204483 | A1 | 8/2012 | Van den Heuvel et al. |
| 2012/0283493 | A1 | 11/2012 | Olson et al. |
| 2016/0083902 | A1 | 3/2016 | Henriksson et al. |

FOREIGN PATENT DOCUMENTS

WO    2012/092475 A1    7/2012

OTHER PUBLICATIONS

PCT/US2015/051464, International Search Report and Written Opinion, Dec. 21, 2015 (17 pages).
€130M Recycling & Autoclave Ad Biogas Plant for Wakefiled, http://www.waste-management-world.com/articles/2013/01/130m-recycling-and-autoclave . . . (2 pages) printed May 16, 2014.
Rotoclave® Applications, http://www.tempico.com/dynamic.php?pg=Applications . . . (1 page) printed May 16, 2014.
Stephen Barnes, "World First: Autoclaving for Advanced Digestion", http://waste-management-world.com/articles/print/volume-14/issue-1/wmw-special- . . . (5 pages) printed May 16, 2014.
Yamashita, Kyoko et al., "Compositions of Volatile Organic Compounds Emitted from Melted Virgin and Waste Plastic Pellets", Journal of the Air & Waste Management Association, 59:3, (2009), pp. 273-278.
Green Box—100% Reclamation System, http://www.greenboxna.com/index.php (1 page) printed May 16, 2014.
United States Environmental Protection Agency, Decision Document: Approval of Fiberight Municipal Solid Waste Separation Plan, Jun. 2012, 7 pages.
Gershman, Brickner & Bratton, Inc.—2nd Annual Waste Conversion Congress East Coast, Jun. 12-13, 2012, 24 pages.
ArrowBio—Proven Solutions for sorted and unsorted waste!, http://www.arrowbio.com (1 page) printed May 16, 2014.
PCT/US2015/051464, International Preliminary Report on Patentability, Mar. 29, 2017 (10 pages).

*Primary Examiner* — Mark Halpern

(57) ABSTRACT

Integrated methods and systems for recycling waste material including waste paper are provided, the methods including treating the waste material in the pressure vessel at an elevated processing temperature and an elevated processing pressure to form a treated waste material including a substantially re-pulped waste paper; discharging the treated waste material from the pressure vessel; and thereafter separating and diluting the treated waste material to dilute a portion including the substantially re-pulped waste paper to from about 1% to about 20% by weight solids. The recovered paper pulp fraction and substantially fiber-free recoverable/recyclable plastics and metals may be further separated and used as feedstock in a variety of subsequent processes.

37 Claims, 10 Drawing Sheets

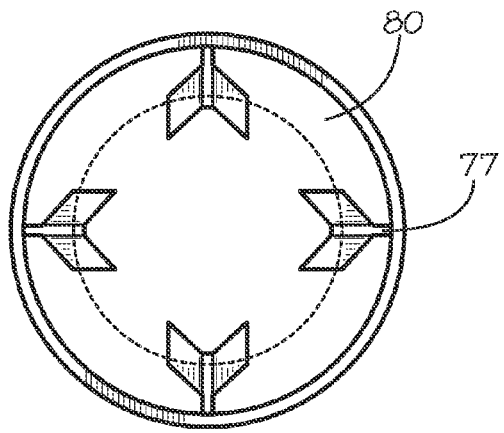 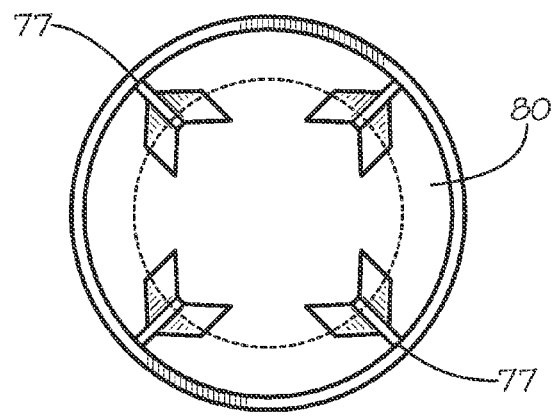
FIG. 8A  FIG. 8B
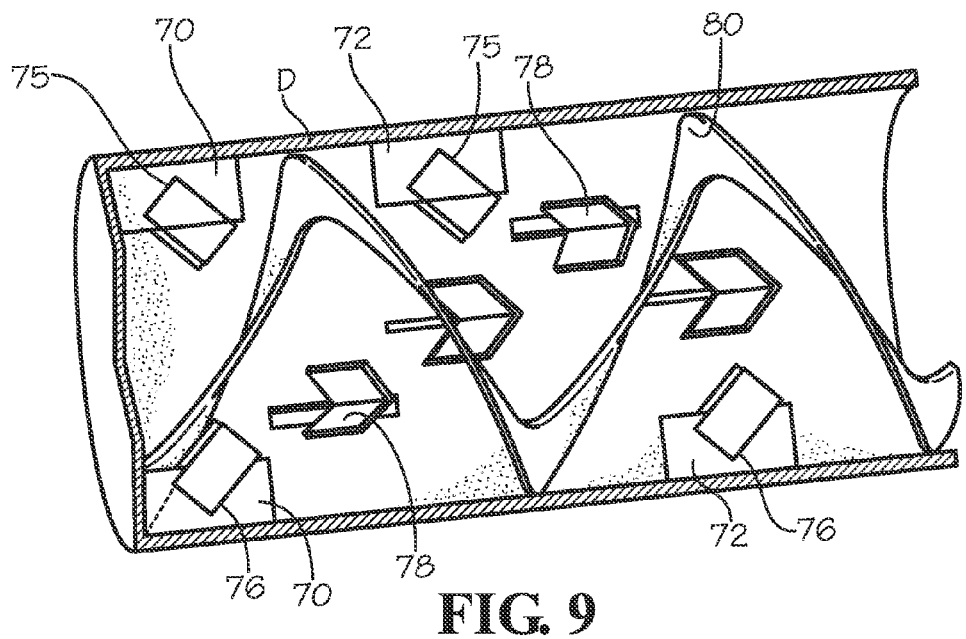
FIG. 9

US 9,752,279 B2

INTEGRATED METHOD AND SYSTEM FOR RECYCLING WASTE MATERIAL

CROSS-REFERENCE TO RELATED APPLICATIONS

This application claims priority to U.S. Provisional Application No. 62/060,150, filed on Oct. 6, 2014, the disclosure of which is incorporated by reference herein in its entirety.

FIELD OF THE INVENTION

The present application relates generally to methods for recycling waste material including waste paper into useful products. More specifically, this application relates to a method and system for recycling waste material that is integrated with a pulp and paper mill.

BACKGROUND

Recycled waste paper is a major source of feedstock for the manufacture of paper products. The recycled waste paper may be generated from various sources of waste material, which often includes other recoverable and recyclable materials. For example, common sources of waste material frequently include polymeric materials, such as plastics, and metals, such as aluminum.

Although these recoverable and recyclable materials may be obtained from various sources of waste material and used as feedstock for the manufacture of various products, existing methods of recovering these materials are inefficient and subject to the economics of labor intensive recovery, sorting, and cleaning processes. For example, many existing methods of recovering these reusable materials require sorting the materials at the source or at an intermediate facility prior to subsequent processing of the materials into useful products. Thus, there remains a need for more efficient methods for processing waste materials to increase recovery and recycling of more of the waste materials in a more economical process.

SUMMARY

Embodiments of the present application address the above-described needs by providing methods and systems for recycling waste material including waste paper.

In one aspect, a method is provided that includes introducing the waste material into a pressure vessel; treating the waste material in the pressure vessel at an elevated processing temperature and an elevated processing pressure to form a treated waste material including a substantially re-pulped waste paper; discharging the treated waste material from the pressure vessel; and thereafter separating the treated waste material with a screening device into a first portion and a second portion. The first portion may include the substantially re-pulped waste paper and the second portion may include large debris. The step of separating may further include washing the first portion through the screening device with an amount of water sufficient to dilute the first portion to from about 1% to about 20% by weight solids.

In another aspect, an integrated system for recycling waste material including waste paper is provided. The integrated system may include a pressure vessel configured to receive and treat the waste material in the pressure vessel at an elevated processing temperature and an elevated processing pressure to form a treated waste material including a substantially re-pulped waste paper; a screening device for receiving the treated waste material and configured to separate the treated waste material into a first portion and a second portion, the first portion including the substantially re-pulped waste paper and the second portion including large debris; and a water supply device configured to wash the first portion through the screening device with an amount of water sufficient to dilute the first portion to from about 1% to about 20% by weight solids.

These and other features, aspects, and advantages of the present invention and embodiments thereof will become better understood when the following detailed description is read with reference to the accompanying drawing, where the components are not necessarily to scale and in which corresponding reference numerals designate corresponding parts throughout the drawings.

BRIEF DESCRIPTION OF FIGURES

FIG. 8a is a cross sectional view taken along lines 8a-8a of FIG. 7;

FIG. 8b is a cross sectional view taken along lines 8b-8b of FIG. 7;

FIG. 9 indicates the relationship of the lifting paddles to the helical baffle disposed around the interior surface of the rotating drum of FIGS. 3-8b;

DETAILED DESCRIPTION

Figure 1:
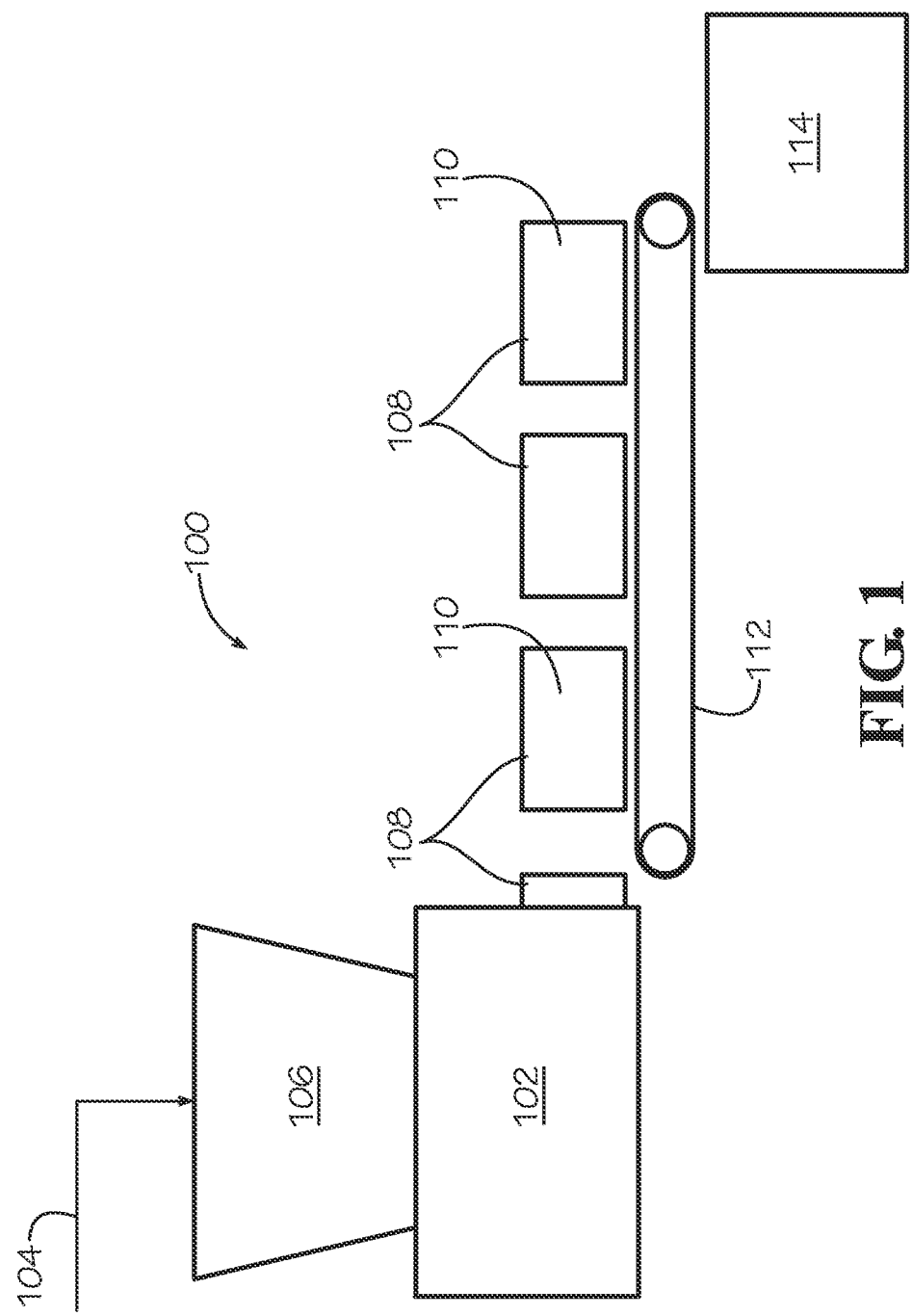
FIG. 1 is a schematic illustration of a waste material baling system according to an embodiment.
Figure 2A:
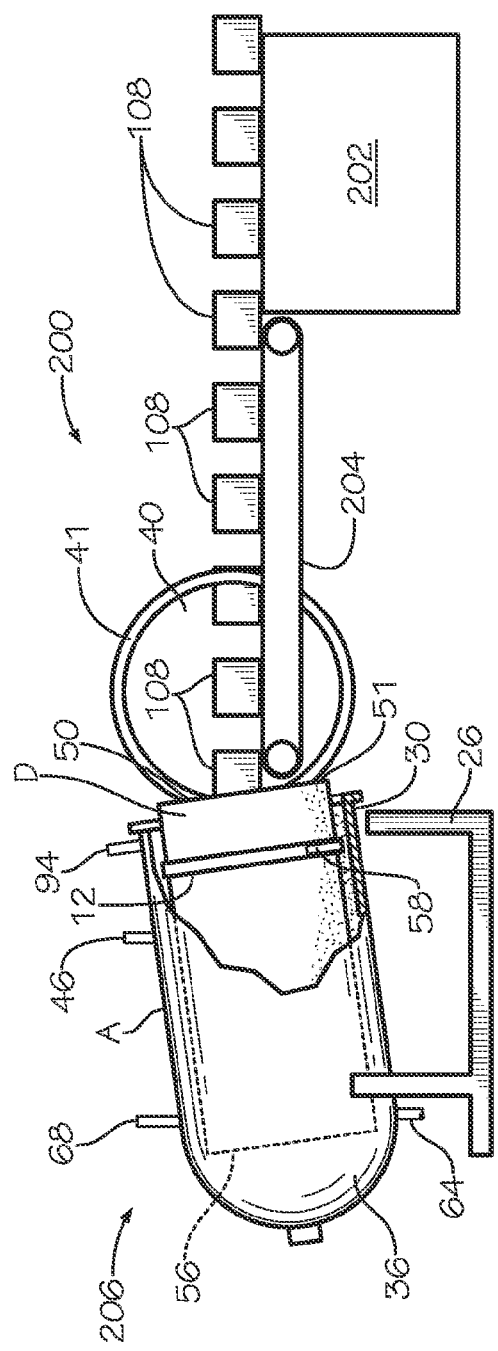
FIG. 2a is a schematic illustration of a waste material recycling system receiving baled waste material according to an embodiment.
Figure 2B:
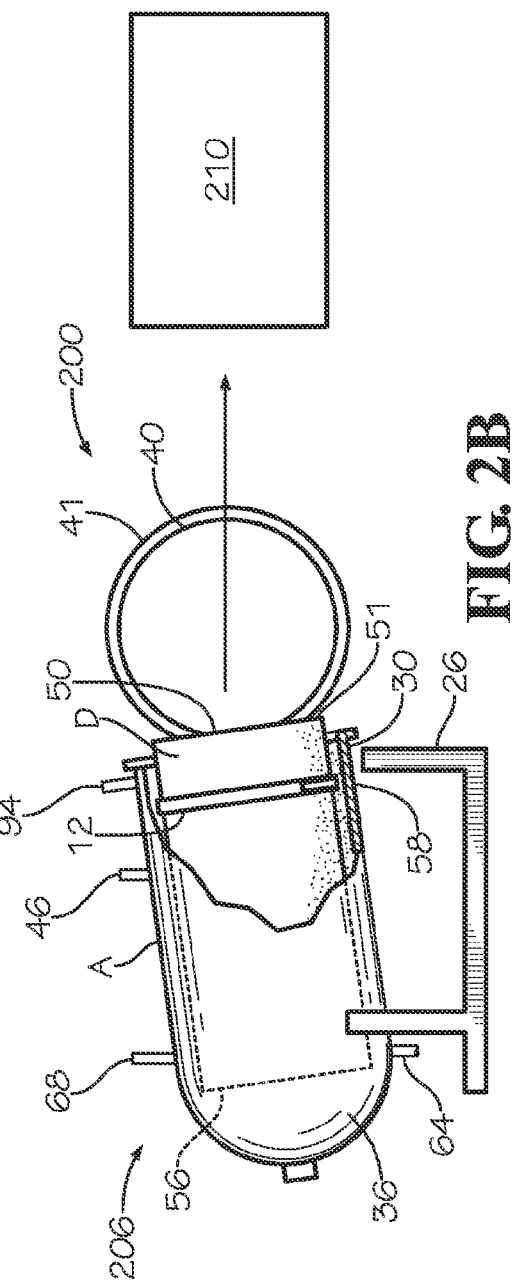
FIG. 2b is a schematic illustration of a waste material recycling system discharging treated waste material according to an embodiment.

The present application provides systems and methods for efficiently recycling waste material including waste paper. Generally described, the methods comprise introducing a waste material including waste paper into a pressure vessel; treating the waste material in the pressure vessel at an elevated processing temperature and an elevated processing pressure to form a treated waste material including a substantially re-pulped waste paper; discharging the treated waste material from the pressure vessel; and thereafter separating the treated waste material with a screening device into a first portion and a second portion. The first portion may comprise the substantially re-pulped waste paper and the second portion may comprise large debris. In embodiments, the step of separating the two portions further comprises washing the first portion through the screening device with an amount of water sufficient to dilute the first portion to from about 1% to about 20% by weight solids.

Advantageously, the separated substantially re-pulped waste paper and non-cellulosic solids from the treated waste material provide a clean feedstock that may be used as feedstock for a variety of different processes. For example, the substantially re-pulped waste paper may be used to manufacture post-consumer paper-containing products or converted to one or more organic acids, organic acid degradation products, and the like. In addition, washed and essentially fiber free recyclable plastics and metals may be recovered from the second portion and either marked as is for sale or is used for the manufacture of refuse derived fuel, pyrolyzed to produce one or more products suitable for use as fuel, or converted to polymer flakes or films (i.e., polyethylene terephthalate flakes or films). Liquids and solubilized organics also may be used in subsequent processes, such as in an anaerobic digester to produce biogas.

According to embodiments, the waste material can be municipal solid waste or commercial solid waste or the like. The term "municipal solid waste" means all waste materials discarded for disposal by households, including single and multifamily residences, and hotels and motels. The term also includes waste materials generated by commercial, institutional, and industrial sources, to the extent such wastes are essentially the same as waste normally generated by households or were collected and disposed of with other municipal solid waste as part of normal municipal solid waste collection services. Examples of municipal solid waste include food and yard waste, paper, plastics, metals, clothing, appliances, consumer product packaging, disposable diapers, office supplies, cosmetics, glass and metal food containers, and household hazardous waste.

The term "residential waste" means waste generated by normal activities of households including, but not limited to, food waste and other organic material, rubbish such as paper, metal, and plastic, ashes, and bulky waste.

The term "commercial solid waste" means all types of solid wastes generated by stores, offices, restaurants, warehouses, educational and institutional facilities, and other non-manufacturing activities, excluding residential and industrial wastes. This waste material is high in paper and, therefore, paper fiber content as well as polyethylene terephthalate (PET) plastic content relative to municipal solid waste. Commercial solid waste also includes plastic and metal, but is low in yard waste, polyvinyl chloride (PVC) plastic, construction materials, appliances, cosmetics, household hazardous waste, and large metal items relative to municipal solid waste. Commercial solid waste is typically collected at sites such as airports, restaurants, office buildings, educational institutions, and amusement or theme parks.

The term "re-pulp" means to detach or at least partially separate from one another fibers that have been attached to, bonded with, or entangled with one another such as are cellulosic fibers in paper. In the context of this description, re-pulping paper means to at least partially separate cellulosic fibers of paper from one another to form a loose cellulosic fiber pulp.

1. Treatment of Waste Material

According to an embodiment, a process is provided for recycling waste material, particularly that including mixtures of waste paper and polymeric waste material such as plastics, utilizing a pressure vessel of generally cylindrical configuration mounted to be driven in inclined rotation about its longitudinal axis, said process comprising the steps of: a) introducing the waste material and dilution water through an inlet of the pressure vessel; b) adding thermal energy to the waste material in the pressure vessel to impart an elevated processing temperature and an elevated processing pressure to the waste material inside the pressure vessel to a level above atmospheric pressure; c) rotating the pressure vessel about its longitudinal axis, so as to agitate the waste material to accomplish re-pulping of the fibrous paper fraction; d) de-pressurizing the vessel by venting the steam through a condenser followed by pulling a vacuum on the condenser in order to begin the cooling of the material; e) thereafter introducing cooling water into the pressure vessel so as to cool the treated waste material in the pressure vessel to a discharge temperature below that achievable in the previous step and reduce odor emitted by the treated waste material; and f) discharging the treated waste material from the pressure vessel, wherein said paper fraction is substantially re-pulped and substantially detached from said polymeric or plastic waste material and other contaminants in said waste materials. In an embodiment, the polymeric waste material is operative to concentrate contaminants including color bodies from the waste material.

According to an embodiment, a process is provided wherein a rotating apparatus referred to in the art as a Rotoclave® apparatus (available from Tempico, Inc., Madisonville, La., USA) is used. A desired amount of waste material is placed in an inner drum of the Rotoclave by allowing rotational motion of auger vanes in the drum to draw the waste material further into the drum. The pressure vessel door is closed and sealed, a vacuum is drawn in the chamber to eliminate the effects of the partial pressure of air trapped in the vessel, and dilution water is added. The Rotoclave chamber is then isolated and steam is introduced through a steam inlet valve until the desired processing temperature and pressure are reached. The Rotoclave drum is rotated while the waste material is contained in the drum at the desired processing temperature and pressure for a preset reaction time to form a treated waste material. Steam is used to maintain the temperature and pressure throughout the preset reaction time. After the preset reaction time, a steam valve for introducing the steam into the drum is closed and the drum is vented to atmospheric pressure, which, in turn, also reduces the temperature in the chamber. Following the first venting step, a vacuum is drawn to further reduce the temperature of the treated waste material.

The drum is then vented to the atmosphere again and cooling water is thereafter introduced into the chamber to further cool the treated waste material to a discharge temperature and dilute the one or more odorous compounds and the chamber is opened. The treated material inside the drum is then removed by reversing the drum rotation so that the auger vanes deliver the treated material to the front of the drum where it then exits onto a discharge conveyor for further screening to remove the coarse material.

Pressure Vessel

In accordance with an embodiment, the autoclave pressure vessel generally may be an elongated vessel of cylindrical configuration mounted to be driven in rotation about its longitudinal axis and is provided with agitating means including an array of fixed lifting paddles present in the interior of said vessel. The agitation of the waste materials may comprise the action of the lifting paddles in the vessel, concurrent with rotation of said vessel. In accordance with an embodiment, the vessel may be provided with a helically configured member.

Any suitable pressure vessel that can bring about the needed effects in processing the waste material may be employed in connection with the systems and methods provided herein. According to an embodiment, however, the pressure vessel may be equipped advantageously with suitable agitating means to facilitate proper agitation of the waste material. A suitable pressure vessel in accordance with an embodiment is a pressure vessel of generally cylindrical configuration mounted to be driven in inclined rotation about its longitudinal axis as disclosed in U.S. Pat. Nos. 5,119,994; 4,974,781; and 6,458,240, and U.S. patent application Ser. No. 14/256,652 filed with the U.S. Patent Office on Apr. 14, 2014, and entitled "Method For Recycling Waste Material With Reduced Odor Emission," the disclosures of which are incorporated herein by reference in their entirety. Such a pressure vessel is equipped with suitable means for agitation to uniformly mix the waste material and break up the plastic-containing and paper-containing waste materials. Examples of suitable agitating means include mechanical, hydromechanical or electrical devices. Specific examples of mechanical devices include mechanical stirrers, shakers, blenders, tumblers, and the like. It has been found that an array of fixed lifting paddles and a helically configured member mounted in an interior section of a pressure vessel cooperate as one example of agitating means for an embodiment of this invention. According to an embodiment, the agitating means is provided within a drum, which is rotatably mounted at an incline inside a pressure vessel.

Thus, an autoclave for treatment of waste material in accordance with an embodiment involves the generally cylindrical vessel mounted at a slight angle of incline with respect to the horizontal plane, with the angle of incline being of an embodiment of about 7°, the upper end of the vessel having an opening to receive waste material and the lower end of the vessel being closed. The vessel may be designed with a highly effective closure device on the opening that, when closed, seals the vessel from the atmosphere to allow a buildup of pressure to occur within the vessel during its operation, or, alternatively, permit a vacuum to be maintained within the vessel by the functioning of an appropriate vacuum system.

Referring to FIGS. 3-11, there is shown an autoclave for practicing a process in accordance with an embodiment as disclosed in U.S. Pat. No. 6,458,240. The apparatus includes a heavy walled processing pressure vessel A that is generally cylindrical in configuration. Heavy walls are used in the construction of the pressure vessel A in order that it can operate under conditions of high internal pressure as well as on occasion, under vacuum conditions as noted above. The pressure vessel A is mounted in a non-rotatable manner on a sturdy stationary support 26 and has a sufficiently wide base as to give ample stability. The support 26 may utilize structural steel members designed to effectively transfer the weight of the processor and waste material to the foundation under the processor.

The rotating drum about to be described, that is utilized within the shell of the vessel A, transfers its forces to carrier and support bearings, which in turn transfer that load into the shell of the vessel A and become a part of the load supported by the structural supports of the shell, and thus transferred to the foundation below the processor.

A closure device or dome shaped door 40, provided with a seal 41, is hingedly mounted adjacent the inlet 30 of the vessel A so that substantial pressure or a vacuum can be established inside the vessel at selected times, as mentioned previously.

Located inside the non-rotating vessel A is a generally cylindrical drum D mounted so as to be rotatable in either direction on its axis, which axis is coincident with the axis of the vessel A. Drum D is provided with a riding ring or support ring 12 adjacent to its front end 50, with rollers or trunnion bearings 58 being positioned on the interior of vessel A to contact the ring 12, and thus provide support for the front end 50 of the drum D. The front end 50 of the drum D is open, whereas the rear or lower end 56 of the drum is closed and watertight.

Affixed to the rear or lower end 56 of the drum D is drive shaft 16, which is arranged to support the rear end of the drum D and drive it in rotation. The shaft is rotatably supported by roller or ball bearings 17 that are in turn supported from a structural member 19 attached to the vessel A. This support arrangement is designed to fix the location of the drum D insofar as its horizontal positioning within the vessel A is concerned.

The drive shaft 16 of the drum D penetrates the shell of the vessel A and is sealed from the atmosphere by a seal 33 to enable a selected pressure or a selected vacuum to be maintained from time to time within the vessel A, and of course within the drum D.

The typical rate of rotation for the drum D is between 2 and 30 rpm, and preferably approximately 8-15 rpm, to facilitate a uniform loading of forces on the drive mechanism 14 utilized for driving the drum in rotation.

Figure 3:
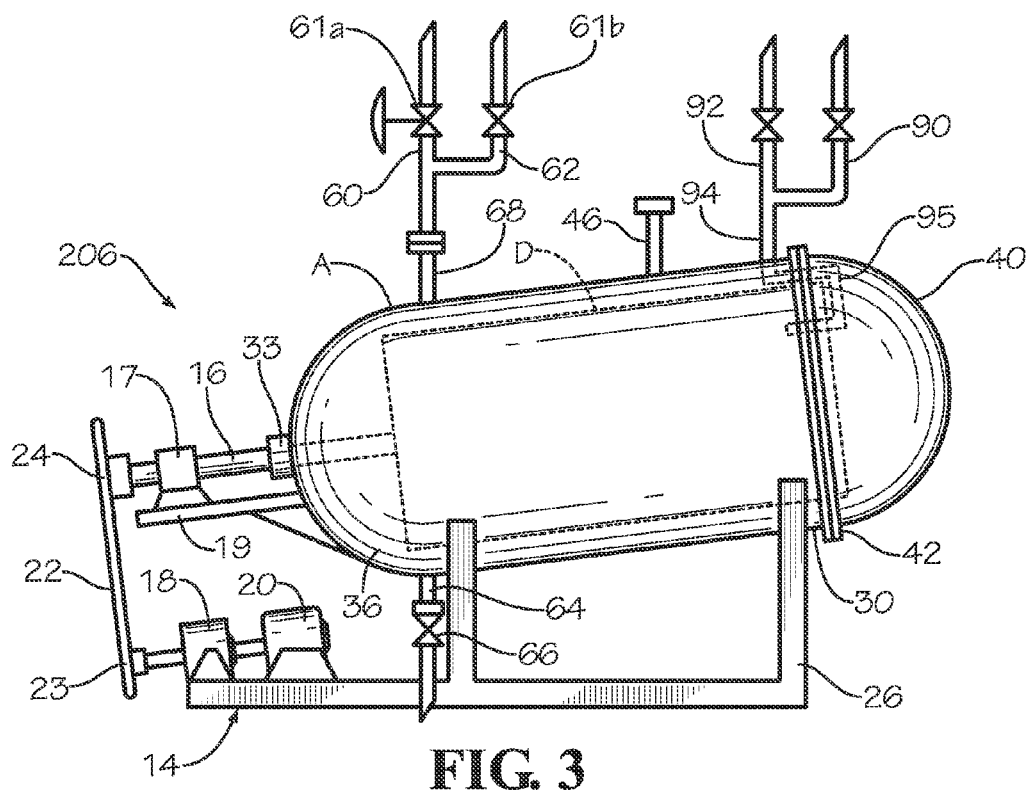
FIG. 3 is a side elevational view of an autoclave used in an embodiment.
Figure 4:
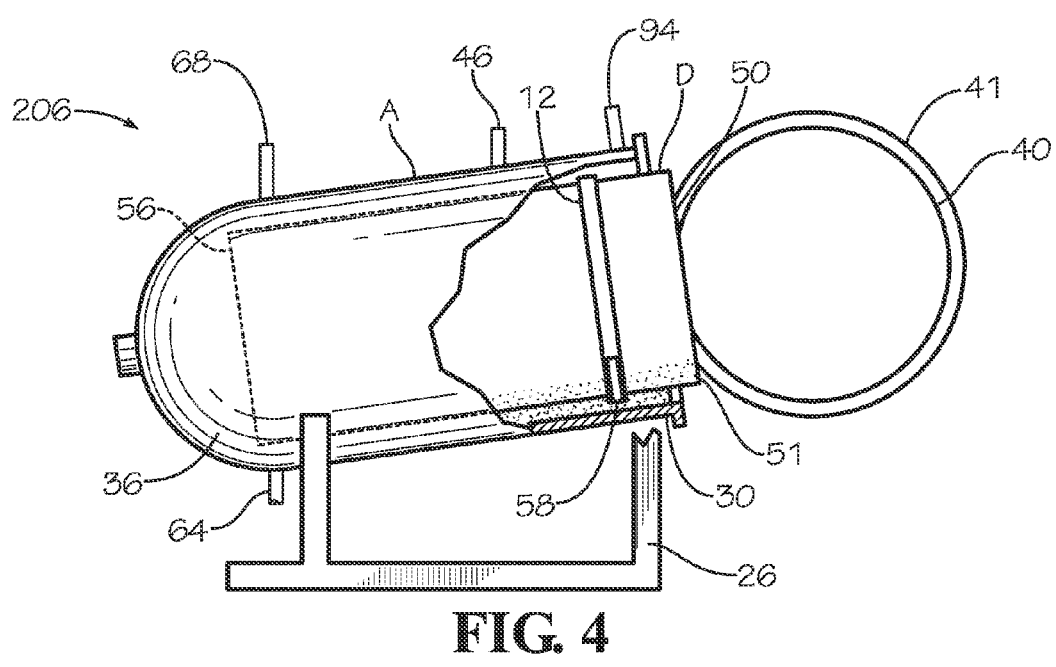
FIG. 4 is a view of the vessel of FIG. 3, in partial section, showing the rotating drum, and showing the autoclave's closure panel in the open position.
Figure 5:
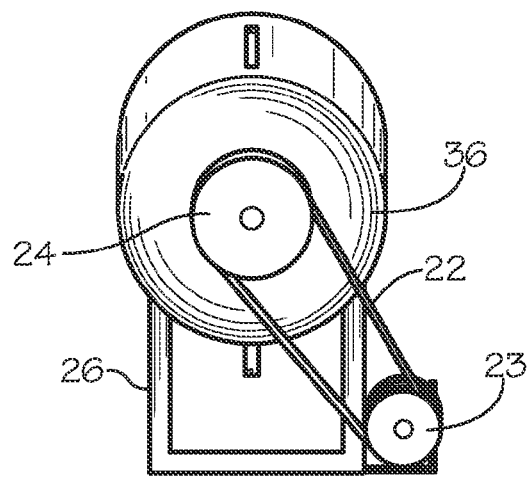
FIG. 5 is an end view in elevation of the pressure vessel of FIG. 3; this view showing the drive belt and motor used for driving the drum in rotation.
Figure 6:
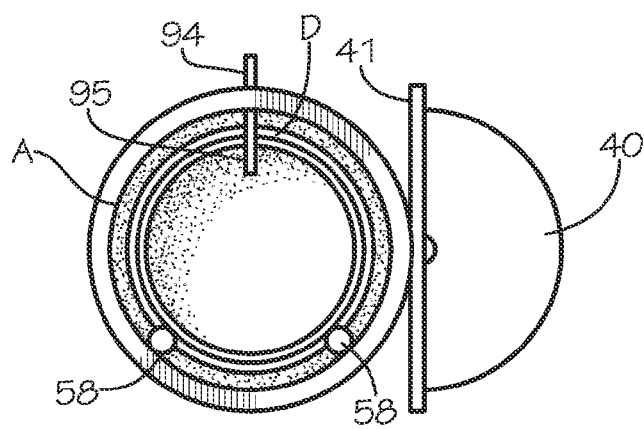
FIG. 6 is an end view of the autoclave of FIG. 3, illustrating operation of the closure panel.

The drum D is capable of being rotated in either direction on its horizontal axis by means of the drive assembly 14 depicted in FIG. 3 that may, for example, utilize a reversible electric motor 20 and suitable reduction gearing 18 connected to the drive shaft 16 of the drum to turn the drum D in the selected direction. It may be preferable to use a heavy duty chain 22 passing over sprockets 23 and 24 for transferring the rotation of the motor to the drive shaft, in an arrangement familiar to those knowledgeable in the art, as depicted in FIGS. 3 and 5.

By placing the drum D within the pressure vessel A, it is possible to have the same advantages of unobstructed agitation of materials as it would have had in a free-standing rotatable drum. By designing the drum to have adequate containing walls, the waste materials that are being processed and any additives to be inserted into those materials are contained within the drum during processing. Because, in accordance with this embodiment, the drum is disposed within a pressure vessel, the materials of construction of the drum are considerably lighter than are required for a free-standing, rotatable drum, which would have required the structural integrity to withstand the forces of pressure as well as the forces associated with the vacuum that will be utilized from time to time in the process.

The interior of drum D is equipped with a series of lifting paddles 70 and a helical flighting 80 to facilitate agitation and movement of waste materials as a consequence of rotation of the drum D. The lifting paddles used for the instant invention and the flighting are described in more detail below.

Vessel A, in accordance with an embodiment, is preferably operated on an incline. One suitable angle of incline is 7° from the horizontal, with the front or inlet end 30 being higher than the closed lower end 36 of the vessel. The angle of incline aids in containing the waste materials to be processed within the drum D in that the waste materials will be moved through the drum D toward the back end, at least partly under the influence of gravity as the drum is rotated.

Although there is no limitation for the size of drum D, it is to be noted that a device utilizing a drum approximately ten feet long is of a size that can be effectively utilized in a recycling station. In other words, a smaller sized version of a waste processor in accordance with an embodiment could take the form of a unit that could be placed within a relatively limited area, to handle smaller scale any special type waste materials generated therein.

At the same time, it is obviously possible to use larger units to perform large scale operations, and by the foregoing mention of a processor of a size to be used in a disposal facility is not intended to limit the largeness or smallness of any processor, except that the diameter of the vessel should be sufficiently large as to accept materials upon which a prior size reduction has not taken place. Any combination of reasonable diameters and lengths could be utilized in accordance with this invention, limited only by practicality.

Returning to the details of this embodiment, the lifting paddles 70 are mounted on the interior of the drum D and are arranged so as to minimize any obstruction of flow of materials within the drum. The lifting paddles are distributed in sections along the horizontal dimension of the drum, as shown in FIG. 7, and are staggered at approximately 45° intervals from one section to the next.

Figure 7:
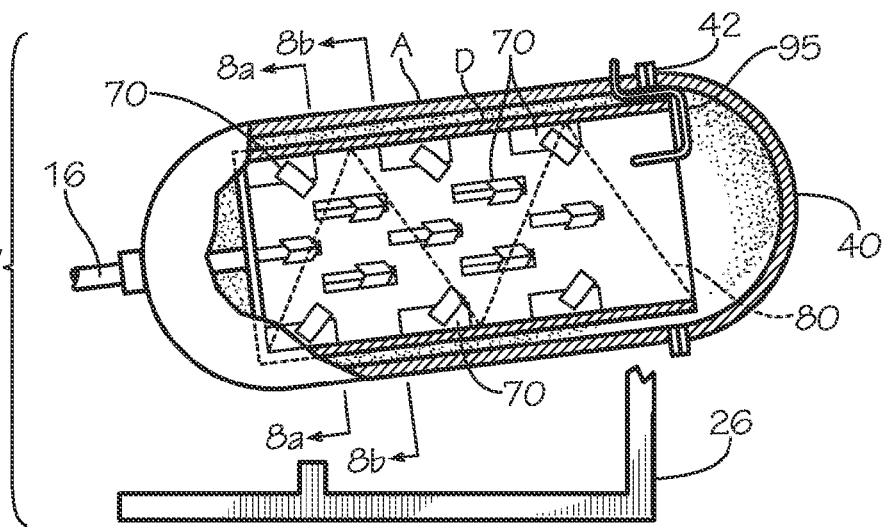
FIG. 7 is a side elevational view of the apparatus of FIG. 3, in partial section, showing lifting paddles disposed in a spaced array around the interior of the rotating drum, with the location of a helical baffle being indicated by the use of dashed lines.

The lifting paddles 70 are affixed to the interior perimeter of the drum D perpendicular to the shell of the drum, as shown in FIGS. 8a and 8b, and are oriented lengthwise to correspond with the longitudinal dimension of the drum, as is shown in FIGS. 7 and 9.

Figure 10:
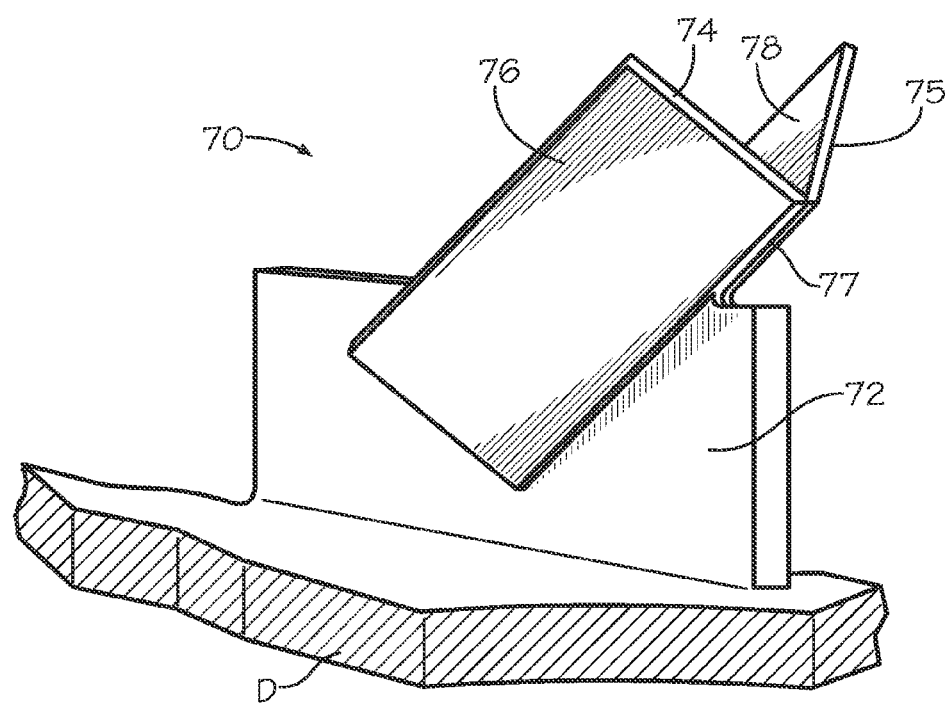
FIG. 10 is an enlarged scale drawing of a typical lifting paddle utilized in connection with an embodiment, also showing an adjacent portion of the drum in cross section, the closure panel end of the drum being toward the left as viewed in this figure.

As best seen in FIG. 10, the perpendicular leg 72 is affixed to the interior sidewall of the drum, and the angled member 74 is affixed at its midline 77 to the radially inner portion of the perpendicular leg. The angled member 74 has external surfaces 75 and 76, with surface 75 being at an angle of approximately 45° from the perpendicular leg 72 of the lifting paddle, and surface 76 being at a like angle to the leg 72. The surfaces 76 are preferably considered as the first portions, and the surfaces 75 of the paddles are considered as the second portions. The midline 77 of the angled member 74 may be at an angle of approximately 52° with respect to the interior surface of the drum D, and as shown in FIG. 10, the midline 77 is placed in a direction that is toward the higher end of the drum D. Stated somewhat differently, the interior portions 78 of the lifting paddles face the closed end 56 of the drum D, which is to the left as viewed from the perspective of FIG. 10.

In an embodiment, the angle of incline of the drum is about 7° with respect to the horizontal, so the angle of incline of the angular portions 75 and 76 of the lifting paddle is 52° with respect to the shell wall of the drum D, and this results in the angular portions 75 and 76 of the lifting paddle operating at an angle of 45° with respect to the horizontal.

The helical flighting or baffle 80 is affixed to the interior perimeter of the drum D so as to minimize obstruction of flow of waste material within the drum, and may be at a frequency corresponding to one complete cycle of the helix in a distance equal to the diameter of the drum, measured along the length of the drum. The angularity of the helical flighting is such that when the drum D is rotated in what is called the first rotative direction, the waste material to be processed is moved forward, toward the closed lower end 56 of the drum, whereas rotation of the drum in the second rotative direction causes the materials to be moved backward toward the inlet opening 50 of the drum. The helical flighting is continuous, meaning that occasional lifting paddles 70 must be eliminated at certain locations in order to make fabrication possible.

The size and frequency of the lifting paddles, the angle of incline of the drum and the rate of rotation of the drum are variable and are a function of the required rate of movement of materials within the drum and the amount of material to be processed in a given amount of time.

The diameter of the drum may be sufficient to accept a selected quantity of waste material to be processed, with an additional space of approximately 40% of the volume of the interior diameter of the drum needed to remain vacant to allow materials to fall and to mix within the drum as it rotates. In a design of this type of device, additional processing capacity is added to the processor by increasing its length. The ratio of diameter to length is variable and depends upon the amount of material to be processed in a given amount of time in concert with the size and frequency of the agitation mechanisms of the drum to insure complete mixing of waste material and water.

Devices for monitoring and controlling the process include, for example, water piping, steam piping, vacuum piping, pressure controllers and other needed instruments. In using a free-standing, rotatable drum, each of these devices may be affixed to the centerline of the axis of rotation of the rotatable drum, which complicates the closure devices on such a vessel and, by necessity, places these devices at the ends of the drum. In the case of pressure controllers, vacuum connections and temperature controlling instruments, this is not an appropriate location. Rather, devices of this type may better monitor and control the process from a location that is nearer to the point in the process where the reaction is taking place, and not adjacent to or at the opposite end of the injection of additives to the process. Thus, some embodiments utilize a pressure vessel in which a rotating drum is utilized.

Inducing pressure and vacuum further complicates the utilization of a free-standing, rotating drum. Vacuum, in particular, requires that the device have considerable strength to keep from collapsing, and this generally equates to massive components, requiring considerable horsepower if such components are to be driven in rotation.

In some embodiments, in which the waste material is introduced as plastic-wrapped waste material bales, the closure device of the pressure vessel may require that the closure device be of large size. Because of their large size and because of the pressure and vacuum conditions of the process, the closure devices would be very difficult to handle manually. Automatic closure device operators that would be affixed to a free-standing, rotating drum can be complicated. In this embodiment, the drum is rotated for a time period during which the closure device is open, and thus, the closure device and its operator must not interfere with the ability of the drum to rotate under these circumstances.

With reference to FIG. 3, the vessel A is equipped with piping 90 for the selective addition of steam and piping 92 for the selective addition of both dilution and cooling water, with suitable valves being utilized in order to control the flow. The steam piping and the water piping are combined into a single injection pipe 94 as shown in FIG. 3, enabling steam and water to be conducted through the sidewall of the vessel A and then injected into the open end of the drum D, through curved fixed pipe 95.

Figure 11:
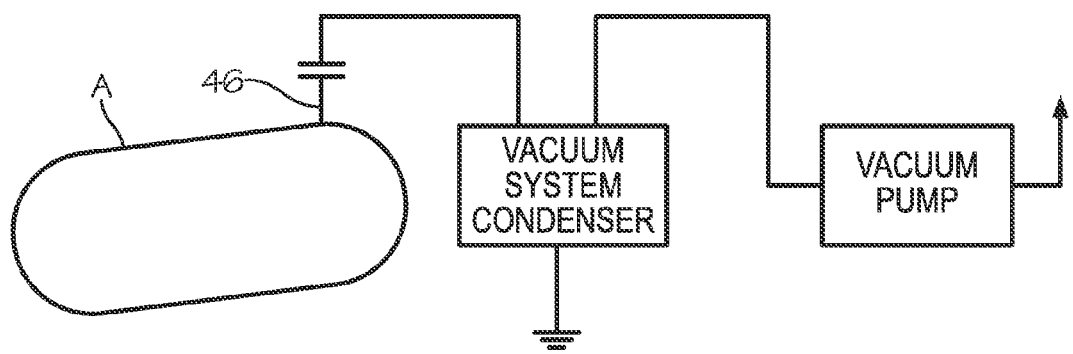
FIG. 11 is a schematic of a vacuum system used in connection with an embodiment.

During one phase of the operation of the device, vacuum may be induced into the vessel A by a vacuum system such as the type manufactured by Nash Engineering Company of Norwalk, Conn. or Croll-Reynolds Company, Inc. of Westfield, N.J., connected to the vessel by vacuum connection 46; note FIG. 11.

Waste Material Introduction

The waste material suitable for use in embodiments may be in the form of municipal solid waste, commercial solid waste, residential waste, sanitary waste, industrial waste, or the like, that includes waste paper. Non-limiting examples of waste paper present in such waste material include newspaper or other inked paper products, magazines, cartons, containers, cups, plates, tissues, paper towels or other adsorbent paper products, leaflets, flyers, envelopes, cardboard, boxes, bags, printed and unprinted paper sheets, posters, and the like. The waste material also may include one or more odorous compounds or material that forms one or more odorous compounds during re-pulping or when stored, non-limiting examples of which include organic material such as food waste and beverage waste or both, along with possible polymeric waste materials such as plastic cups, plastic bottles, plastic containers, and the like. Organic material means matter composed of organic compounds of or relating to animal or plant constituents or products having a carbon basis, including those that come from the remains of dead organisms such as plants and animals and their waste products in the environment. Non-limiting examples of organic material include food, beverage, yard waste, agricultural waste, human waste, biological waste, health care institution waste such as hospital or clinic waste, hydrocarbons, oils, solvents or industrial chemicals, or the like and combinations thereof.

In embodiments, the waste material feedstock may include wastepaper and polymeric waste such as coated feedstock provided with latex coatings, fillers and the like. The coatings or polymeric components may include synthetic polymers such as acrylates and vinyl acetates or natural polymers and pastes of starch or organic pastes, as well as natural and synthetic adhesives. The polymeric material may be in the form of a coating, binder or simply be associated with the paper fiber component as in the case of packaging with a paperboard component and plastic film component. In accordance with certain embodiments, the waste material feedstock may include both cellulosic fiber-containing paper and a resinous polymeric component which is agglomerated during the process and operative to segregate other contaminants from the liberated papermaking fiber.

Additional specific examples of difficult-to-process waste materials processable in accordance with some embodiments include single and two side plastic coated board having wet strength resin, single and two side plastic coated board having no wet strength resin, two-sided glossy printer trimmings, ultraviolet (UV) cured ink coated stocks, and mixtures thereof. Further examples of plastic coated boards include two side coated (C2S) plastic food board having wet strength resin, such as milk cartons or other cartons used for dry food storage and the like. Further examples of plastic coated boards having no wet strength resin include ice cream containers, various other frozen food packages and the like. Still further examples include two-sided glossy photo trimmings, ice cream tops, unprinted colored paper, newspaper and the like.

Referring back to FIGS. 1-9 and in accordance with an embodiment, waste material including paper waste, and optionally plastic-containing waste, along with odorous or odor producing compounds is carried by a suitable conveyor and introduced through the inlet opening 30, when the door 40 has been moved to the open position, and into the open end 50 of the drum D. As the waste is not packaged in any particular size and may also contain an assortment of materials varying in size, shape and density, and which may not necessarily be free flowing, the inlet opening 30 in the vessel A and the opening 50 into the drum are large enough and without obstructions so as to allow previously unprocessed waste to be directly introduced into the processor.

The drum D is rotated in the first rotative direction while the waste is being conveyed into the drum, and, by virtue of the helical flighting 80 and the angle of incline of the drum, a sufficient amount of the material, though not free flowing, will be loaded into the drum for processing.

When the drum D has been filled with a sufficient amount of material to be processed, the closure device 40 is closed and is secured by a locking ring 42, such as the type manufactured by the Klinge Products Company of Denmark.

Generally, the weight percent of waste solids (that is, non-pulpable material) in the waste materials is in the range of about 1 weight percent to about 80% by weight based on the total dry weight of the waste materials; whereas, the weight percent of waste solids in the waste materials may otherwise be in the range of about 20% by weight to about 70% by weight based on the total dry weight of the waste materials.

Typically, the waste paper contains no more than about 80% by weight polymeric waste material based on the total weight of paper pulp and polymeric waste material. In some cases, the waste materials contain less than about 10 percent of polymeric waste material based on the total weight of the pulp and the polymeric waste material.

As used herein, the terminology "polymeric", "plastic", "polymer" and like terms means and includes all organic, synthetic, natural or processed natural polymeric materials such as cellulose acetate, including resins, adhesives, foams, films, sheets and alloys (composites) that are molded, cast, extruded, drawn or laminated or otherwise applied onto or into objects or films. Such application may be carried out using any of the water or oil based lattices and by any of the known techniques in the art. Examples of coating techniques include blade coating, dip coating, spray coating, and the like. Specific examples of polymeric materials include addition polymers such as vinyl polymers, including acrylates and vinyl acetate, latexes thereof, polyolefins, condensation polymers such as, polyesters or polycarbonates, and the like.

As described hereinabove, in accordance with an embodiment, suitable waste materials includes plastic-wrapped compressed baled waste material such as municipal solid waste or commercial solid waste.

Referring back to FIGS. 3-11 and in accordance with an embodiment, plastic-wrapped waste material bales are carried by a suitable conveyor and introduced through the inlet opening 30, when the door 40 has been moved to the open position, and into the open end 50 of the drum D. The inlet opening 30 in the vessel A and the opening 50 into the drum are large enough and without obstructions so as to allow plastic-wrapped waste material bales to be directly introduced into the processor.

The drum D is rotated in the first rotative direction while the plastic-wrapped waste material bales are being conveyed into the drum D, and, by virtue of the helical flighting 80 and the angle of incline of the drum, a sufficient amount of the plastic-wrapped waste material bales will be loaded into the drum for processing.

When the drum D has been filled with a sufficient amount of plastic-wrapped waste material bales to be processed, the closure device 40 is closed and is secured by a locking ring 42, such as the type manufactured by the Klinge Products Company of Denmark.

Dilution Water

Turning back to the embodiment illustrated in FIGS. 1-9, a substantial amount of dilution water is added to the waste material to be processed, this being accomplished by injecting dilution water through pipe 92, such that sufficient dilution water is brought into contact with the waste material in the drum, via the curved stationary pipe 95. Dilution water is usually added to the pressure vessel drum D to accomplish water content in the drum D of between 30% and 75% by weight of total waste material and water in the drum, with approximately 70% by weight being the amount in accordance with a particular embodiment. In accordance with another embodiment, the dilution water is introduced into the pressure vessel drum D through pipe 92 in an amount up to about 3 parts by weight dilution water to about 1 part by weight waste material, or an amount up to about 7 parts by weight dilution water to about 3 parts by weight waste material, or an amount from about 0.43 parts to about 3 parts by weight dilution water to about 1 part by weight waste material.

In accordance with embodiments, the dilution water may be substantially pure water, but may be potable or non-potable water. The dilution water may contain additives such as chemical aides described in more detail below.

The drum D is ordinarily rotated in the first rotative direction during the dilution water addition to enhance the contact of the waste materials with the dilution water.

Once all of the material is loaded into the vessel, the pressure vessel door is closed and sealed. The drum D is then rotated in the first rotative direction, during which a vacuum may be drawn in the chamber for a short period, about one to five minutes or five to ten minutes. One of the purposes of applying a vacuum at this stage is to prevent the buildup of pressure by the trapped non condensable gasses. At the end of the vacuum draw period, the vacuum is shut off and the system is isolated by closing the valve. After the vacuum draw period is complete, the dilution water is added to the drum D chamber.

Chemical Aids

In accordance with the embodiments, addition of suitable chemical aids during the agitation process may improve the quality of the pulped paper fraction. The extent of re-pulping may increase from the use of chemical aids. In addition, the pulp formed in the presence of certain chemical aids may be brighter and could reduce the extent of additional process steps. The chemical aid may be introduced into the pressure vessel before or after the drum door has been closed and locked and may be added to the pressure vessel before, with or after the waste material, or with the dilution water.

Thus in accordance with an embodiment, there may optionally be included at least one chemical aid selected from the group consisting of alkaline agent, buffer, bleaching agent, detergents, surfactants, solvents, dispersants, chelating agents, sequestrants, and mixtures thereof. These chemical aids either alone or in combination thereof may be used in their bulk form or in solution, preferably as solutions in water. Any amount of these chemical aids may be used to bring about the intended benefit; however, the preferred chemical aids and amounts are described in more detail below.

In accordance with some embodiments, various other chemical aids such as detergents, surfactants, solvents, dispersants, chelating agents, sequestrants either alone or in combination thereof may be added to the waste material for use during re-pulping. All of these chemical aids now known or hereinafter developed for such purpose may be used in quantities sufficient to bring about the intended benefit. However, these chemical aids are used only if the pulp formed therefrom exhibits acceptable qualities.

In accordance with some embodiments, the preferred chemical aids are sodium hydroxide alone or in combination with hydrogen peroxide.

Re-Pulping Conditions

In accordance with embodiments, the processing of the waste material, which includes waste paper, is accomplished with the addition of heat and mechanical energy to sufficiently re-pulp and incidentally to sterilize the waste material. By virtue of the added dilution water, which increases the conduction of heat into the waste material being processed, waste materials that might otherwise produce an insulating effect for themselves and on other materials are completely and quickly penetrated by the required heat, thus avoiding the creation of pockets in which infectious materials could be protected from sufficient heat to accomplish complete re-pulping. Because of the reduction in size of the pulpable fractions of the wastes as they are processed, as previously described, and because the heat of the process causes the plastic fractions of the wastes when present to become heat distorted and to collapse into more compact forms, the entire amount of the waste is more completely agitated and therefore most completely contacted by the heat.

Turning back to the embodiment illustrated in FIGS. 3-11, in the first rotative direction, assumed to be clockwise when viewed from the open end of the drum, waste material is intercepted by the directional flighting 80 and is moved through the drum toward the back or closed lower end 56 of the drum. Simultaneously, the bi-directional lifting paddles 70, by virtue of the angular portion of each paddle, direct a portion of the waste material counter-currently toward the inlet end of the drum as each of the paddles comes in contact with the material during the rotation of the drum. This simultaneous backward and forward movement of materials within the drum by the action of the helical flighting 80 and the surfaces 72 and 76 of the novel lifting paddles 70 during the rotation of the drum D in the desired direction results in an advantageous and a very complete agitation of the materials being processed. Because of these actions and the added dilution water, the re-pulping of the pulpable materials of the waste materials is very effectively accomplished. Thus, in embodiments in which plastic-wrapped waste material bales are used, the bales are completely de-baled in this process.

In some embodiments, the rotating drum apparatus is rotated at a speed of at least about 6 revolutions per minute (rpm), or at least about 8 rpm, or at least about 10 rpm.

In accordance with some embodiments, heat is added to the pressure vessel during the processing of the waste materials. In this case, steam may be advantageously added to the vessel by steam piping 90 and injected into the waste materials by injection piping 94 while the drum D is being rotated in the first rotative direction; note FIG. 3. As previously described, the addition of heat causes plastic materials when present to become softened and to separate while the drum is being rotated, thus allowing the paper fraction that is in close contact with plastic to be completely agitated and contacted with the added moisture and added heat. Desired pressure is maintained in the vessel A by suitable use of the valves of the pressure control system associated with the pressure pipe 60 and the vent connection 62. Valve 61a controls the pressure pipe 60, and valve 61b the vent pipe 62. Pipe 68 forms the connection to the interior of vessel A. The chemical aid as described previously can be additionally added as a liquid or a vapor into the steam line, or alternatively into the water line.

In accordance with some embodiments, a sufficient amount of steam is introduced during the agitation step so as to bring about an internal temperature in the range of about 212° F. to about 285° F. and a pressure in the range of about 0 psig up to about 50 psig or in the range of about 10 psig to about 50 psig. In accordance with some embodiments, a temperature of at least about 230° F. and a pressure of at least about 15 psig to reduce the time required to accomplish pulping is preferred.

In accordance with some embodiments, conditions are controlled so that the time required to accomplish re-pulping is generally from about 30 to 90 minutes, and typically the time required to accomplish re-pulping may be about 60 minutes.

In an embodiment where a sufficient amount of steam is introduced during the agitation step so as to bring about an internal temperature of about 275° F. and a pressure of about 30 psig to reduce the time required to accomplish re-pulping which may be about 40 to 80 minutes in some cases; again, the time required to accomplish pulping is typically about 60 minutes or less. In some embodiments, at least about 80% of the paper is re-pulped, and in some embodiments, at least 90% of the paper is re-pulped. In some embodiments, at least 65% of the paper present is re-pulped.

In accordance with some embodiments, the waste material is held at a temperature of at least about 212° F. for a period of at least about 90 minutes during the re-pulping step, at a pressure of approximately 15 psig, or at a temperature of about 285° F. for a period of at least 40 minutes, at a pressure of approximately 50 psig, or other combinations of pressure, temperature and time as have been shown to accomplish complete and effective re-pulping of contaminated waste. In accordance with some embodiments, a sufficient amount of steam is introduced into the pressure vessel during drum rotation while the waste material is being agitated so as to bring about an internal temperature of about 230° F. and a pressure of about 18 psig to reduce the time required to accomplish re-pulping, which time is about 40 to 60 minutes, or 60 minutes. In accordance with other embodiments, the internal temperature is about 275° F. at a pressure of about 45 psig, the time to accomplish re-pulping being about 40 to 80 minutes, or about 60 minutes.

Post Re-Pulping Pressure Reduction

After the waste materials have been processed for a sufficient amount of time at a sufficiently high temperature, the steam injection to the system is shut off, the pressure vessel drum is vented to atmospheric pressure, and then the vacuum system 46 depicted in FIG. 11 is turned on while continuing to rotate the drum in the first rotative direction to induce a vacuum in the pressure vessel chamber to cool the treated waste material in the pressure vessel. As the vacuum is induced, the treated waste materials are cooled from the re-pulping processing temperature to a lower temperature. In accordance with some embodiments, the vacuum induced ranges from about −5 psig to about −15 psig or about −10 psig and reduces the temperature of the treated material to as low as about 170° F. or about 160° F. or as low as about 150° F.

Cooling Water

Cooling water is introduced into the pressure vessel to continue to cool the treated waste material in the pressure vessel to a discharge temperature below the elevated re-pulping processing temperature and to reduce odor emitted by the treated waste material. The addition of the cooling water reduces or eliminates odor that is or would otherwise be emitted when the treated waste material is discharged. Water and the treated waste material in the pressure vessel form a treated waste material slurry in the pressure vessel. While not wishing to be bound by theory, it is believed that the cooling water reduces the odor by reducing the temperature of the treated material or diluting the treated material slurry or both. It is also believed that the cooling water absorbs odorous compounds in the treated material that would otherwise be released into the surrounding atmosphere. Such odorous compounds may be present in the waste material or are produced during re-pulping of the treated waste material slurry or both. In some embodiments of this invention, sources of odorous compounds include food or beverage waste or both.

Turning back to the embodiment illustrated in FIGS. 3-11, an amount of cooling water is added to the treated waste material, this being accomplished by injecting cooling water through pipe 92, such that sufficient cooling water is brought into contact with the waste material in the drum D, via the curved stationary pipe 95. Cooling water is added to the pressure vessel drum D to accomplish total water content in the drum D of between 78% and 95% by weight of total waste material and water in the drum, with approximately 80% being the amount in accordance with a particular embodiment. In accordance with another embodiment, the cooling water is introduced into the pressure vessel drum D through pipe 92 in an amount such that a total amount of water present in the pressure vessel after the cooling step is at least about 3.5 parts by weight to about 1 part by weight treated waste material or at least about 3.8 parts by weight to about 1 part by weight treated waste material.

In accordance with embodiments, the cooling water is added to the treated waste material in an amount sufficient to reduce the temperature of the treated waste material in the pressure vessel by at least about 10° F., or by about 10° F. to about 50° F., or by about 10° F. to about 30° F. In accordance with embodiments of this invention, the cooling water is added to the treated waste material in an amount sufficient to reduce the temperature of the treated waste material in the pressure vessel from a temperature of at least about 170° F. to a temperature of no more than about 140° F., or from a temperature of at least about 160° F. to a temperature of no more than about 140° F., or from a temperature of at least about 160° F. to a temperature of no more than about 130° F.

In accordance with embodiments, the cooling water is added to the treated waste material at a temperature up to about 130° F., or up to about 120° F., or from about 70° F. to about 130° F., or from about 70° F. to about 120° F., or from about 70° F. to about 115° F.

In accordance with embodiments, the cooling water is added to the treated waste material in an amount sufficient to increase total water content in the pressure vessel by at least about 5% by weight of the total water and waste material content of the pressure vessel, or at least about 10% by weight of the total water and waste material content of the pressure vessel, or by about 5% to about 40% by weight of the total water and waste material content of the pressure vessel.

In accordance with embodiments, the cooling water may be substantially pure water, but may be potable or non-potable water. The cooling water may contain additives such as odor modifiers and/or biocides.

Discharging Treated Waste

After cooling with the cooling water, the treated waste materials are discharged from the rotating vessel for the recovery of the re-pulped materials and plastics for recycling. In accordance with some embodiments, the discharged treated waste material includes solids in an amount from about 5% by weight to about 50% by weight based on the total wet weight of the discharged treated waste material. Preferably the solids concentration of the discharged treated waste material is an amount from about 10% by weight to about 40% by weight based on the total wet weight of the discharged treated waste material, from about 10% to about 25% by weight based on the total wet weight of the discharged treated waste material, from about 10% to about 20% by weight based on the total wet weight of the discharged treated waste material, or from about 30% to about 40% by weight based on the total wet weight of the discharged treated waste material.

Further, as stated hereinabove, the waste paper present in the treated waste materials is substantially re-pulped. In accordance with some embodiments, the waste paper is at least about 80 percent re-pulped, or the waste paper is at least about 90 percent re-pulped.

Turning back to the embodiment in FIGS. 3-11, the closure device 40 is opened and the drum D is rotated in the second rotative direction. In the second rotative direction, assuming counter-clockwise rotation, the treated waste materials are intercepted by the helical flighting 80 and are directed toward the inlet end of the drum D by the action of the helical flighting 80. As the drum D continues to rotate, the treated waste materials are also lifted and directed toward the inlet end of the vessel by the surfaces 75 of the "Y" shaped lifting paddles 70, as previously described.

The angular surfaces 75 and 76, on each side of the perpendicular surface of the paddles, function in an equal manner in either rotative direction, assisted of course in each instance by the vertically disposed member 72.

It is to be noted that the lifting paddles 70 are functioning in a counter-current or refluxing manner with respect to the helical flighting 80 during processing, with the surfaces 76 serving in a primary manner at such time. Only after the waste materials have been fully processed the rotative direction of the drum D is reversed, so as to enable the helical flighting 80 to discharge the material out over the lip 51 of the drum into a suitable discharge system. At this time of discharge, the surfaces 75 of the paddles 70 serve in a primary manner, in effect cooperating with the action of the helical flighting 80.

The treated waste materials are thus discharged from the vessel by the combined action of the helical flighting 80 and the surfaces 72 and 75 of the lifting paddles 70 during the rotation of the drum D in the second rotative direction. Because the outer lip 51 of the drum D protrudes beyond the outer rim of the vessel A, the discharged treated waste materials fall clear of the vessel. By virtue of the re-pulping of the paper materials, the volume of the treated waste material is reduced to approximately ⅓ of its original volume.

The rate of discharge of the treated waste materials, as is apparent to those skilled in the art, is dependent on the rate of rotation of the drum D, the size and frequency of the helical flighting 80, and the size and number of the lifting paddles 70 and these variables are dependent on the amount of material to be processed in a given amount of time and are not limited to a single combination of these variables.

Drain connection 64 is equipped with a suitable valve 66, which can be opened to enable moisture to be drained from the shell (pressure vessel A) upon excess accumulation thereof.

The treated waste materials are then directed to separators for the separation and recovery of the re-pulped paper fraction and further to collect the separated plastic materials, as described herein below. Although the above-described embodiments of pressure vessels suitable for use in the integrated recycling systems and methods of the present application are batch processes, those skilled in the art will appreciate that pressure vessels configured for continuous use also may be used.

2. Wet Processing and Separation of Treated Waste Material

The treated waste materials are further diluted during, and optionally prior to, separation of the treated waste materials by one or more substantially non-destructible separation processes. "Substantially non-destructible" refers to a process that does not cause significant size reduction of the materials or degradation of the materials. For example, a separation process may be characterized as substantially non-destructible when the median size of the treated waste material after separation is at least 85% of the treated waste material prior to separation. Non-limiting examples of various separation processes include density separation, size separation, optical separation, and metal separation.

Figure 12:
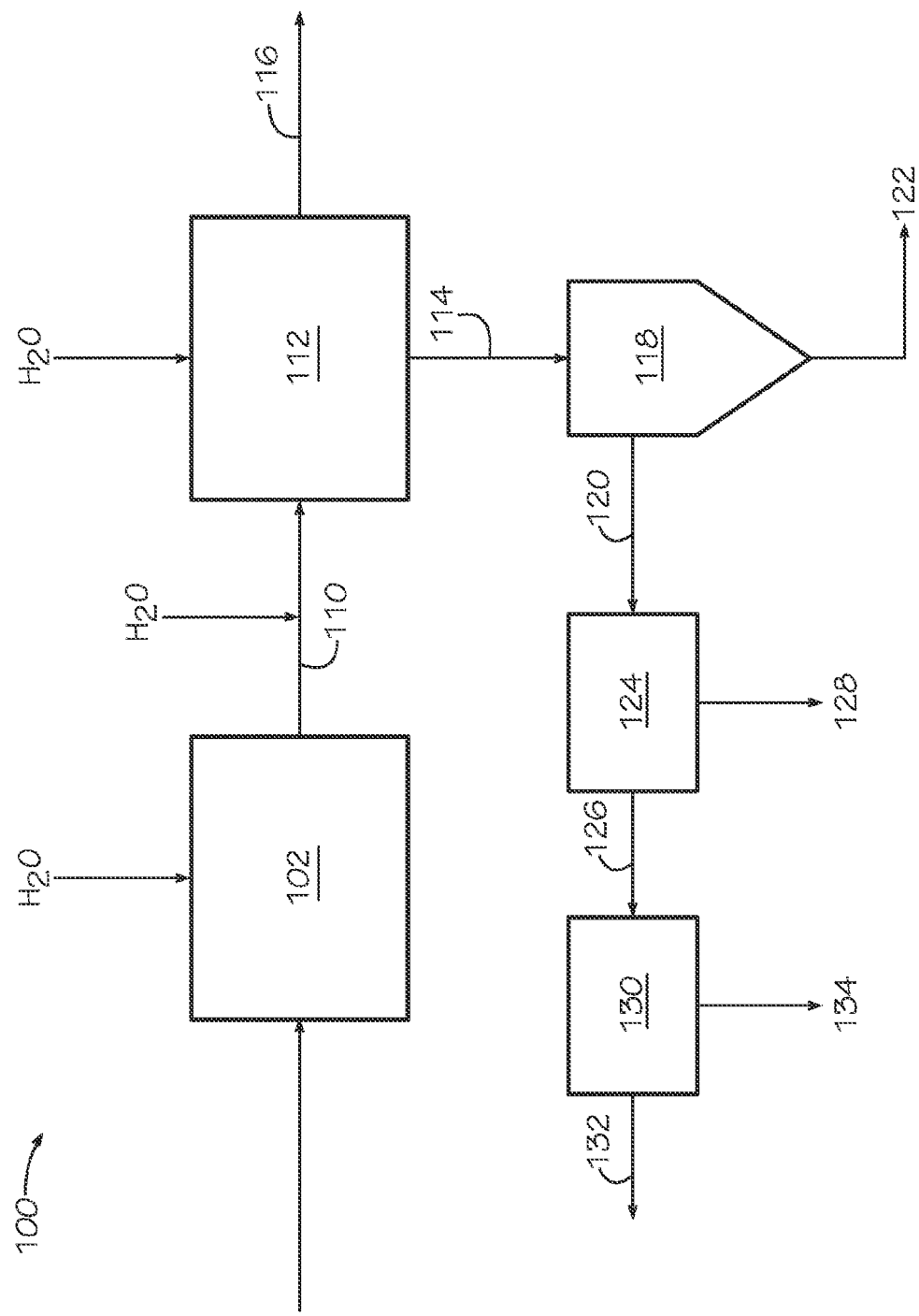
FIG. 12 is a process flow diagram of a wet processing and separation system according to an embodiment.

An exemplary embodiment of the wet processing and separation system 100 for treated waste material 110 discharged from an autoclave 102 is illustrated in FIG. 12. The treated waste material 110 is separated into two or more portions using one or more screening devices 112. Non-limiting examples of such screening devices include trommels, coarse screens, fine screens, vibrating flat screens, finger screens, ballistic separators, drum re-pulpers, and the like. A first portion 114 may include those materials that are able to pass through the apertures of the screening device, non-limiting examples of which include an aqueous mixture of the re-pulped waste paper fraction and small debris, such as small pieces of plastic, metal, glass, grit, and the like, and liquids and solubilized organics. In embodiments, the solids of the first portion may include a re-pulped waste paper fraction in an amount from about 20% to about 90% by weight of the solids of the first portion, from about 50% to about 90% by weight of the solids of the first portion, from about 50% to about 80% by weight of the solids of the first portion, from about 50% to about 70% by weight of the solids of the first portion. For example, the re-pulped waste paper fraction constitutes about two-thirds of the solids of the first portion and the plastics constitute about one-third of the solids of the first portion. A second portion 116 of the separated treated waste material may include the oversized materials that are unable to pass through the trommel (also referred to as rejects), non-limiting examples of which include large debris such as rags, cans, and large pieces of plastics and metals.

Water is added to the treated waste material during separation, further diluting the treated waste material and washing the first portion through the apertures of the screening device 112. In embodiments, water is added to the treated waste material in the screening device in an amount sufficient to dilute the first portion to from about 1% to about 20% by weight solids, from about 1% to about 10% by weight solids, from about 1% to about 6% by weight solids, from about 2% to about 5% by weight solids, or from about 3% to about 5% by weight solids.

The apertures of the one or more screening devices may be adjusted depending on the size of the materials desired in the first portion, and may be the same or may vary along the length of the screening device. For example, in embodiments a screening device may have a plurality of holes/openings with an average area from about 20 to about 400 mm$^2$.

The first portion may undergo further processing to separate the re-pulped waste paper fraction from a majority of non-cellulosic solids. Various separation processes can be used, including size separation and density separation. For example, in embodiments a second screening device, such as a second trommel, vibrating screen, or air separator, may be used to separate a majority of non-cellulosic solids from the re-pulped waste paper fraction of the first portion to produce a highly washed and substantially fiber-free non-cellulosic solids portion that optionally includes the non-cellulosic solids from the second portion and the first portion. "Substantially fiber-free" means that less than about 20% by weight of the solids is cellulosic solids, more preferably less than about 5% by weight of the solids is cellulosic solids. For example, the substantially fiber-free non-cellulosic solids portion recovered from the first and/or second portions may include cellulosic solids in amounts from about 1% to about 5% by weight on a dry basis.

The non-cellulosic solids portion optionally may be sorted using further separation processes to recover recyclable plastics and metals. For example, metals may be separated by using magnets to recover ferrous metals, eddy currents to recover non-ferrous metals and aluminum, and optical sorting techniques. Plastics may be separated using optical sorting techniques to separate recyclable plastics, such as polyethylenes (including both high and low density), polypropylenes, polyethylene terephthalate, polyvinyl chloride, polyamides, and polystyrene. Still other techniques may be used when it is desirable to reduce the water content of a recovered recyclable material, for example, by mechanically dewatering the recovered recyclable material. Non-limiting examples of techniques for mechanically dewatering include a screw press and a belt press.

In the exemplary embodiment illustrated in FIG. 12, a high density cleaner 118 is used to remove at least a portion of small non-cellulosic solids 122 (e.g., metals, grit, glass, and the like) from the first portion 114. The remainder of the first portion 120, may then undergo further processing using one or more screening processes 124 to separate other non-cellulosic solids 128 (e.g., plastics) from the re-pulped waste paper fraction 126. The re-pulped waste paper fraction 126 may then be mechanically dewatered 130, for example with a screw press or belt press, to remove at least a portion of any liquids and solubilized organics 134 and provide an at least partially dewatered re-pulped waste paper fraction 132 having an increased solids concentration. For example, the dewatered re-pulped waste paper fraction 132 may be from about 50 to about 90% by weight solids, with the solids comprising greater than about 30% by weight cellulosic materials (e.g., cellulose, hemicellulose, and the like).

Advantageously, the dewatered re-pulped waste paper fraction produced by such methods is significantly cleaner than that produced by prior art methods, and is characterized by biochemical oxygen demand (BOD) content of less than about 50 lb/t of dry fiber. In addition, a majority of the cellulosic materials are recovered in the re-pulped waste paper fraction, with the liquids and solubilized organics removed during dewatering the re-pulped waste paper fraction comprising less than about 0.2% by weight suspended solids and having about 90% of the soluble BOD in the re-pulped waste paper fraction. In some embodiments, the methods may be characterized by the reduction of BOD of the dewatered re-pulped waste paper fraction relative to the untreated waste material. For example, the BOD of the re-pulped waste paper fraction may be less than 50% that of the untreated waste material, from about 5% to about 40% that of the untreated waste material, from about 5% to about 20% that of the untreated waste material, or from about 5% to about 10% that of the untreated waste material.

Figure 13:
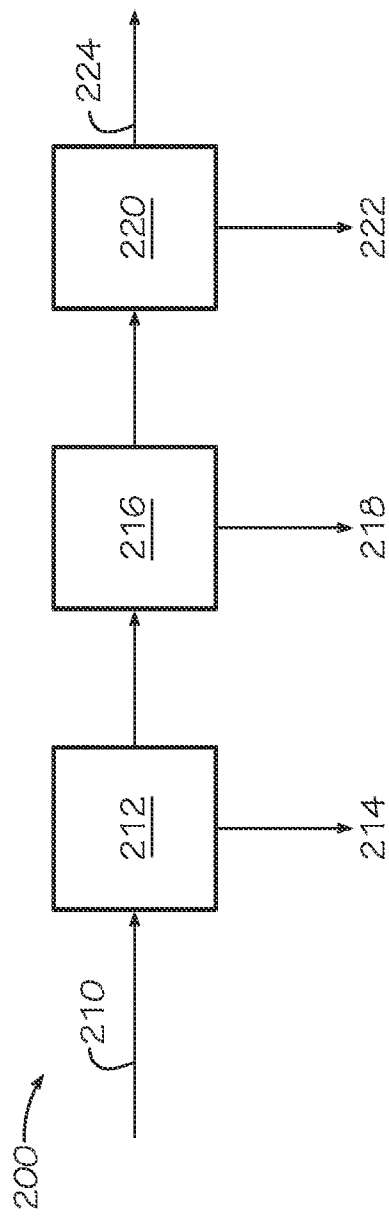
FIG. 13 is a process flow diagram of a separation system for separating non-cellulosic solids according to an embodiment.

The non-cellulosic solids recovered from the treated waste material in the second portion and/or the first portion also may undergo one or more processes to recover the recyclable plastics and metals. In an exemplary embodiment, the process 200 for separating non-cellulosic solids 210 from the treated waste material is illustrated in FIG. 13. For example, metals may be separated from the first or second portion of the treated waste material 210 by using one or more magnets 212 to separate ferrous metals 214 and by using eddy currents 216 to separate non-ferrous metals and aluminum 218. Plastics 222 may be optically separated 220 from the first or second portion of the treated waste material to recover one or more of polyethylenes, polypropylenes, polyethylene terephthalate, polyvinyl chloride, polystyrene, and the like 224. The separated recyclable metals and plastics may then be used as feedstocks in one or more subsequent processes to produce other useful products.

3. Recycled Paper Products

In embodiments, the re-pulped paper fraction (either before or after mechanical dewatering) may be used as at least a portion of a cellulosic feedstock in the manufacture of a post-consumer paper-containing product. In some embodiments, the paper-containing product is either a paper tissue or a paper towel product. In some embodiments, the process further includes utilizing the re-pulped paper fraction for the production of other paper-containing products, such as paperboard suitable for making paper plates, absorbent paper sheets, newsprint papers, or cardboard products, including corrugated cardboard paper products.

4. C5 and C6 Reaction Products

In embodiments, the re-pulped paper fraction (either before or after mechanical dewatering) may undergo chemical processing to form one or more furaldehydes, organic acids, organic acid degradation products, and the like. For example, the re-pulped paper fraction may be converted to the one or more furaldehydes, organic acids, organic acid degradation products, or combinations thereof, by hydrolyzing the cellulose in the re-pulped paper fraction to glucose, and converting the glucose to one or more furaldehydes, organic acids, organic acid degradation products, or combinations thereof (individually or collectively referred to hereafter as the "organic acid compounds"). Non-limiting examples of organic acid compounds include levulinic acid, formic acid, acetic acid, propionic acid, and the like.

The re-pulped paper fraction may be converted to organic acid compounds in one or more reactors using either a continuous or batch process. In addition, various types of re-pulped paper fraction and other types of biomass feed may be added to the process streams or one or more reactors in a variety of locations.

The step of hydrolyzing the re-pulped paper fraction may comprise contacting the re-pulped paper fraction with steam, a combination of steam and one or more of at least one acid or at least one alcohol. Suitable acids include mineral acids such as hydrochloric acid, nitric acid, phosphoric acid, sulfuric acid, and the like, and organic acids such as acetic acid, formic acid, and the like. According to embodiments, the acid may be added to the re-pulped paper fraction in an amount from about 0 to about 10% by weight of the re-pulped paper fraction. According to an embodiment, the mineral acid may be formed from a precursor, such as sulfur dioxide, added to the re-pulped paper fraction. Suitable alcohols include methanol, ethanol, propanol, butanol, and the like.

In embodiments the step of hydrolyzing the re-pulped paper fraction is performed at a temperature in the range of 150° C. to about 250° C., about 170° C. to about 240° C., about 170° C. to about 230° C., about 170° C. to about 220° C., or about 180° C. to about 210° C. In embodiments, the step of hydrolyzing the re-pulped paper fraction may be carried out in a first reactor at a temperature of about 170° C. to about 190° C. for about 35 minutes to about 60 minutes. In embodiments, the first reactor is a tubular reactor with axial mixing, such as a continuous stirred-tank reactor (CSTR). In certain embodiments, the re-pulped paper fraction comprising the glucose may be the desired product and may be used, for example, in various microbiological processes known to those skilled in the art (e.g., as a feed for microorganisms).

The conversion of the glucose may be carried out in the same reactor as the hydrolysis of the re-pulped paper fraction or in a second reactor in series with the first reactor. According to an embodiment, an acid such as a mineral acid or organic acid is added to the second reactor to convert the glucose to one or more organic acid compounds. Suitable mineral acids include hydrochloric acid, nitric acid, sulfuric acid, phosphoric acid, and the like, and suitable organic acids include, acetic acid, formic acid, and the like, and may be added to the hydrolyzed re-pulped paper fraction in the second reactor in an amount of from about 0 to about 10% by weight of the reactor contents or more depending on parameters such as the type of biomass, the particular acid, the temperature in the reactor and the like.

The step of converting the hydrolyzed re-pulped paper fraction generally is performed at a temperature in the range of about 150° C. to about 250° C. that is greater than the temperature used for hydrolyzing the re-pulped paper fraction. For example, in embodiments the step of converting the hydrolyzed re-pulped paper fraction is conducted at a temperature of about 190° C. to about 220° C. for about 1 minute to about 15 minutes. While the step of converting the hydrolyzed re-pulped paper fraction may be conducted in the same reactor as hydrolysis, in embodiments the conversion is conducted in a second reactor comprising a tubular reactor with substantially no axial mixing, such as a plug flow reactor (PFR).

According to an embodiment, the resulting product stream, which may be a mixture of one or more organic acid compounds and tar, may be transferred to a separator for the removal of one or more organic acid compounds. Any suitable separation system known to those skilled in the art can be used to separate the one or more organic acid compounds from the resulting product stream. According to embodiments, methods of separation include those such as liquid-liquid extraction, gas stripping, steam stripping, distillation and the like. The one or more organic acid compounds can then be captured in a condenser, purified in a purifier, and stored in a storage container.

5. Refuse Derived Fuel (RFD)

In embodiments, plastics separated from other non-cellulosic solids may be used for manufacturing refused derived fuel, such as fuel cubes or pellets. Advantageously, refuse derived fuel produced from the clean materials provided by the systems and methods provided herein have a higher energy than those prepared with recyclable plastics produced using prior art methods. For example, the refuse derived fuel produced using plastics recovered by embodiments of the integrated recycling method provided herein may have an energy value of greater than about 5,000 BTU, such as from about 5,000 to about 15,000 BTU, from about 8,000 to about 15,000 BTU, or from about 12,000 to about 15,000 BTU.

Figure 14:
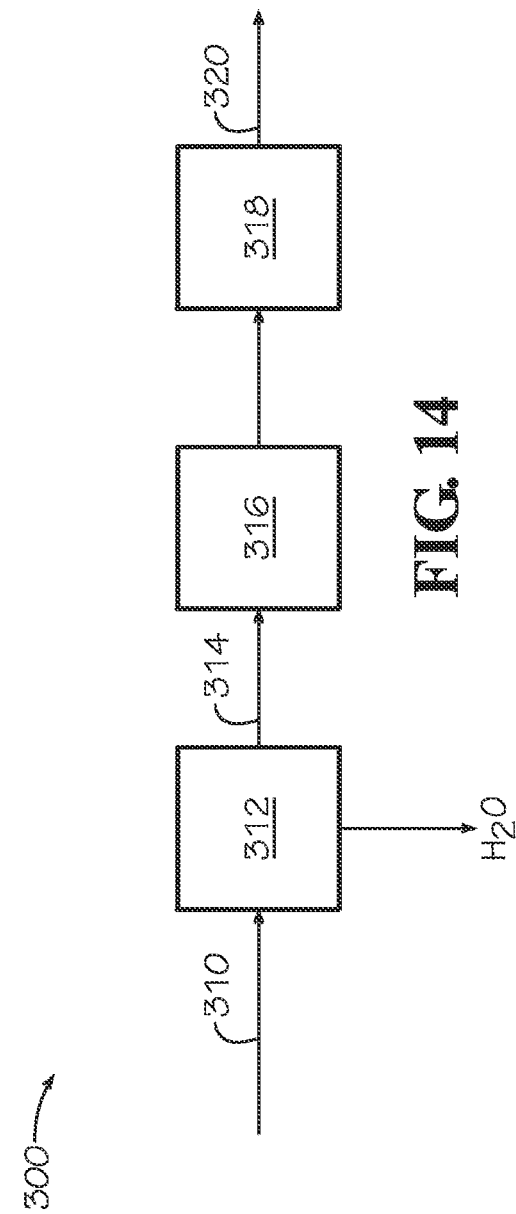
FIG. 14 is a process flow diagram of an integrated recycling system including a system for manufacturing refuse derived fuel according to an embodiment.

An exemplary process 300 is illustrated in FIG. 14. Plastics recovered from the non-cellulosic solids may be combined with rags and other trash recovered from the second portion to provide a feedstock 310 having a solids content of at least 50% by weight. The feedstock 310 may be mechanically dewatered 312 (e.g., by belt press or screw press) to increase the solids content of the dewatered feedstock 314 to greater than about 75% by weight, or greater than about 90% by weight. The dewatered feedstock 314 may undergo a combination of shredding 316 and compressing and/or pelletizing 318 to form the refuse derived fuel 320.

The resulting refuse derived fuel preferably has a plastics content of greater than about 90% by weight, greater than about 92% by weight, or greater than about 95% by weight and have an energy value of greater than about 12,000 BTU. In some embodiments, the refuse derived fuel may then be used to cogenerate electricity used for the processes and systems described herein.

6. Pyrolysis

In embodiments, plastics (with or without polyolefin polymers) separated from other non-cellulosic solids may be pyrolyzed to produce one or more products suitable for use as a fuel. Such systems generally include a pyrolyzer configured to pyrolyze the plastic feedstock. In embodiments, additives such as ash may be added directly to the pyrolyzer via a different inlet than that used to introduce the plastic feedstock or may be added directly to the plastic feedstock prior to entering the pyrolyzer. The pyrolyzer converts the plastic feedstock into one or more products suitable for re-use or intermediates suitable for making more valuable products. For example, the pyrolyzer converts the plastics into fuels, monomers, and other valuable feedstocks and intermediates by thermal and catalytic cracking processes known in the art. Such processes can lead to the production of useful hydrocarbon liquids, such as crude oil, diesel fuel, and the like.

7. PET Flakes or Film

In embodiments, polyethylene terephthalate (PET) optically separated from the other non-cellulosic solids may be used for manufacturing PET flakes of film. For example, the PET may be shredded using methods known in the art to produce PET flakes. Alternatively, the PET may be formed into PET films using methods known in the art.

Advantageously, the methods and systems provided herein eliminate the need for separate pre-processing that generally is required in the prior art. For example, prior art methods require processes for removal of labels, sterilizing, cap removal, and a densifier, before the PET are suitable for further processing.

8. Anaerobic Digestion

In embodiments, at least a portion of liquids and solubilized organics separated from the treated waste material may be introduced to an anaerobic digester for producing a biogas that is suitable for electrical cogeneration. Non-limiting examples of biogases that may be produced by the anaerobic digester include carbon dioxide and methane. The anaerobic digester also may produce a residual material suitable for use as a solid fuel and/or compost.

Figure 15:
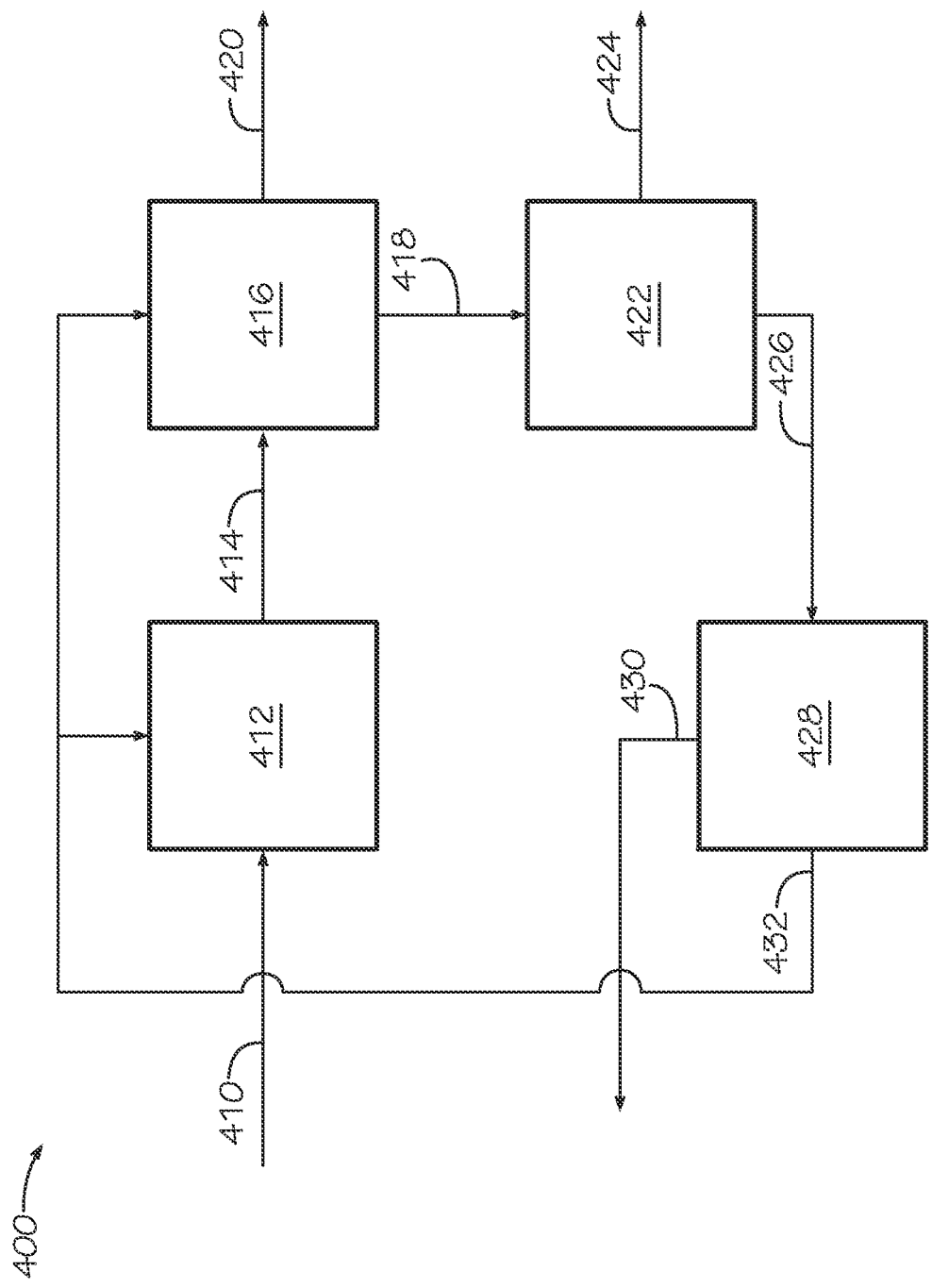
FIG. 15 is a process flow diagram of an integrated recycling system including an anaerobic digester according to an embodiment.

An exemplary system 400 including an anaerobic digester 428 is illustrated in FIG. 15. The waste material 410 is treated in the autoclave 412 to obtain the treated waste material 414, which is separated in a screening device 416 to obtain the first portion 418, including the re-pulped paper fraction, liquids, and solubilized organics, and the second portion 420. The first portion 418 then undergoes further processing 422 in which the re-pulped paper fraction 424 is separated for subsequent processing, resulting in a filtrate 426 including liquids and solubilized organics. The filtrate 426 is introduced to the anaerobic digester 428 to produce a biogas 430. The effluent 432 from the anaerobic digester 428 can then be recycled and reused, for example, as diluent for the autoclave 412 or for the wet processing 416 of the treated waste material 414.

The anaerobic digester advantageously produces a biogas that can be used to co-generate electricity for operating the recycling processes and systems described herein. In embodiments, the amount of biogas that is generated is sufficient to produce up to 70% of the energy requirements of the recycling system.

9. Integrated Systems

Various aspects of the above-described systems and processes may be combined to provide integrated recycling systems for treatment of waste materials. These systems and processes are particularly suitable for use in industrial plants already having water treatment facilities in place. For example, the integrated recycling systems may be co-located at a water treatment facility or any other industrial facility with an on-site water treatment facility, such as a pulp and paper mill.

Figure 16:
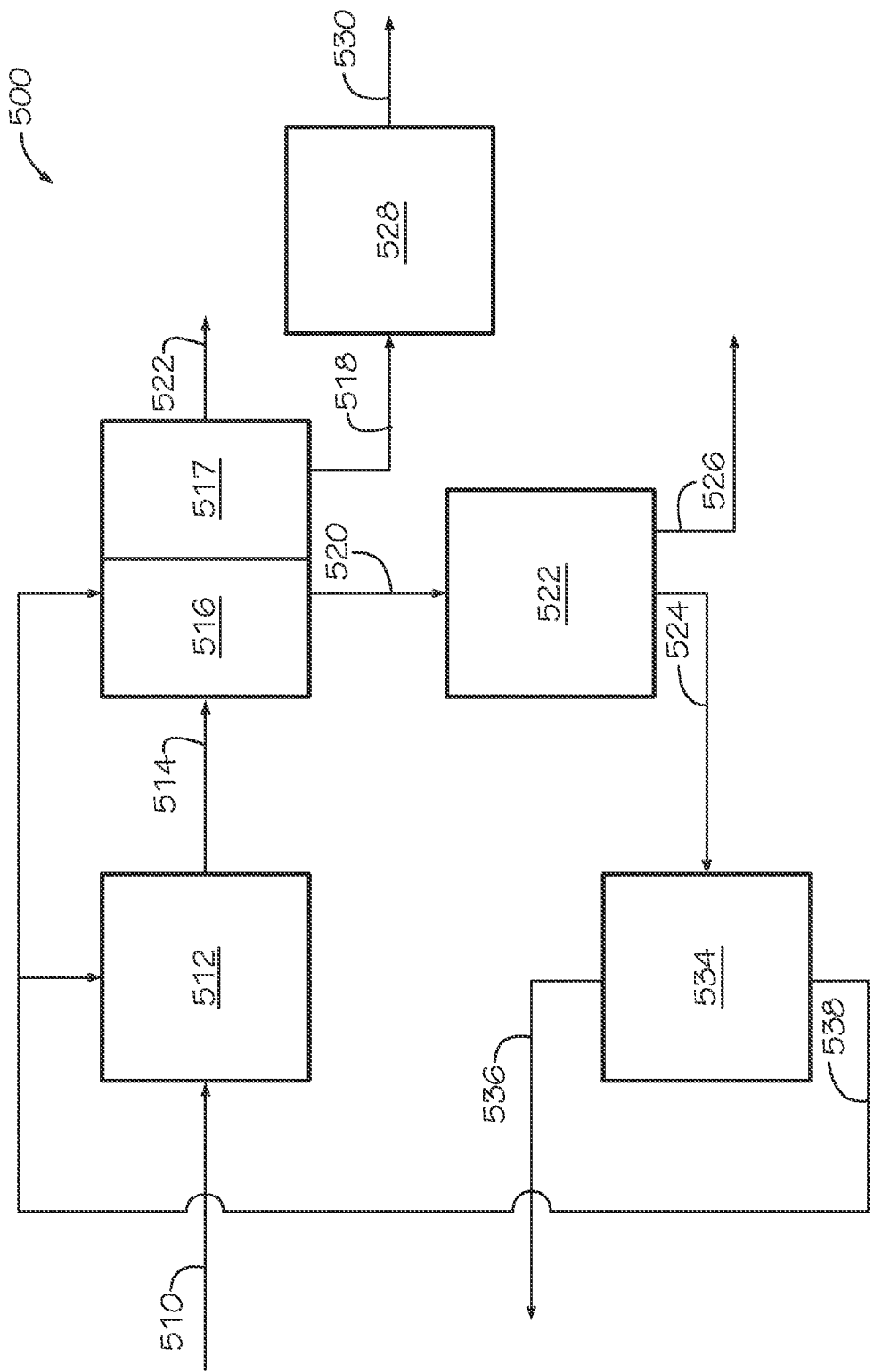
FIG. 16 is a process flow diagram of an integrated recycling system according to an embodiment.

An exemplary embodiment of an integrated recycling system is illustrated in FIG. 16. The system includes a pressure vessel 512 configured to receive and treat the waste material 510 at an elevated processing temperature and pressure. The treated waste material 514 may undergo wet processing and separation in two screening devices 516, 517, in series, into three portions—a first portion 520 including a re-pulped waste paper fraction, a second portion 518 including non-cellulosic solids, and a third portion 522 including large debris.

The first portion 520 may undergo one or more subsequent separations 522 to remove a majority of any non-cellulosic solids (not shown) present in the first portion 520, and may be mechanically dewatered to separate liquids and solubilized organics 524 from the first portion 520, providing a re-pulped paper fraction 526 comprising cellulose present in an amount greater than about 50% by weight of the solids. For example, the solids of the re-pulped paper fraction 526 of the first portion 520 may comprise cellulose in amounts from about 50% to about 90% by weight of the solids, from about 50% to about 80% by weight of the solids, or from about 50% to about 70% by weight of the solids. The re-pulped waste paper fraction 526 may then be used in one or more processes to produce useful products, such as post-consumer paper-containing products or organic acid compounds.

The second portion 518 also may undergo one or more subsequent separations 528 to recover highly cleaned and substantially fiber-free recyclable plastics and metals 530. The plastics may be used in one or more processes to produce refuse derived fuel, one or more products suitable for use as fuel, or PET flakes or films.

Liquids and solubilized organics 524 separated from the treated waste materials may be introduced into an anaerobic digester 534 to produce a biogas 536 and an effluent 538 that may be recycled and reused in the treatment of waste material, such as a diluent or cooling water in the pressure vessel 512 or diluent in the wet processing and separation 516. The refuse derived fuel, products suitable for use as fuel, and biogas also may be reused in the processes and systems, for example, to produce the energy needed to operate the integrated recycling system and process.

Thus, the integrated recycling system and process may advantageously be at least an energy neutral process, requiring no additional energy sources beyond that which is produced in the recycling process. In some instances, the integrated recycling system and process may be an energy producing process, producing more energy than is required in the recycling process. Such excess energy may then be used to reduce external energy needs for the industrial facilities in which the systems are co-located, such as a pulp and paper mill.

Thus, the integrated recycling systems and processes described in embodiments provide numerous advantages, reducing the amount of waste materials that are diverted to landfills or incinerators and efficiently recycling and repurposing the materials to useful products.

For the purposes of describing and defining the present teachings, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Although the teachings have been described with respect to various embodiments, it should be realized these teachings are also capable of a wide variety of further and other embodiments within the spirit and scope of the appended disclosure.

We claim:

1. A method for recycling waste material including waste paper comprising:
   introducing the waste material and water into a pressure vessel;
   treating the waste material in the pressure vessel at an elevated processing temperature of at least about 212° F. and an elevated processing pressure above atmospheric pressure to form a treated waste material including a substantially re-pulped waste paper;
   discharging the treated waste material from the pressure vessel; and
   thereafter separating the treated waste material with a screening device into a first portion and a second portion, the first portion comprising the substantially re-pulped waste paper and the second portion comprising large debris, wherein the step of separating further comprises washing the first portion through the screening device with an amount of water sufficient to dilute the first portion to from about 1% to about 20% by weight solids.

2. The method of claim 1, wherein the discharged treated waste material has a temperature from about 110 to about 220° F.

3. The method of claim 1, wherein the discharged treated waste material comprises solids present in the discharged treated waste material in an amount from about 5% to about 50% by weight of the discharged treated waste material.

4. The method of claim 1, wherein the first portion comprises solids present in the first portion from 3% to about 5% by weight solids.

5. The method of claim 1, wherein the first portion comprises substantially re-pulped waste paper present in the solids of the first portion in an amount from about 20% to about 90% by weight of the solids of the first portion.

6. The method of claim 1, wherein the screening device comprises a plurality of openings having an average area from about 20 to about 400 mm².

7. The method of claim 1, wherein the method is performed on-site at an industrial facility with a water treatment facility.

8. The method of claim 1, further comprising separating the substantially re-pulped waste paper from a majority of any non-cellulosic solids in the first portion using density separation, size separation, or combinations thereof.

9. The method of claim 1, further comprising separating substantially fiber-free recoverable/recyclable plastics and metals from the second portion using a second separation device.

10. The method of claim 9, wherein the second separation device comprises a trommel, a vibrating screen, or an air separator.

11. The method of claim 9, further comprising sorting the substantially fiber-free recoverable/recyclable plastics and metals using one or more techniques selected from the group consisting of density separation, optical separation, and metal separation to separate recyclable metals and plastics.

12. The method of claim 11, wherein the sorting of the substantially fiber-free recoverable/recyclable plastics and metals comprises separating ferrous metals using a magnet, and separating aluminum and non-ferrous metals using an eddy current.

13. The method of claim 11, wherein the sorting of the substantially fiber-free recoverable/recyclable plastics and metals comprises optically sorting plastics to recover one or more of polyethylene, polyethylene terephthalate (PET), polypropylene, polyvinyl chloride, and polystyrene.

14. The method of claim 11, further comprising converting the substantially fiber-free recoverable plastics to a refuse derived fuel having an energy value of about 5,000 to about 15,000 BTU.

15. The method of claim 11, further comprising pyrolyzing the substantially fiber-free recoverable plastics to produce one or more products suitable for use as a fuel.

16. The method of claim 13, further comprising shredding, compressing, and/or pelletizing the substantially fiber-free recoverable plastics to produce fuel cubes or pellets.

17. The method of claim 13, further comprising mixing the substantially fiber-free recoverable plastics with rags and trash recovered from the second portion of the treated waste material to form a mixture, removing water from the mixture to provide a mixture having greater than about 75% by weight solids, and thereafter compressing the mixture to fuel cubes.

18. The method of claim 13, further comprising mixing the substantially fiber-free recoverable plastics with rags and trash recovered from the second portion of the treated waste material to form a mixture, removing water from the mixture to provide a mixture having greater than about 90% by weight solids, shredding the mixture, and thereafter pelletizing the shredded mixture to fuel pellets.

19. The method of claim 13, further comprising shredding the recovered PET to form PET flakes.

20. The method of claim 19, further comprising forming the recovered PET flakes into a PET film.

21. The method of claim 1, further comprising separating the substantially re-pulped waste paper from a majority of any non-cellulosic solids in the first portion using coarse screening, fine screening, or a combination thereof.

22. The method of claim 21, further comprising mechanically dewatering the separated substantially re-pulped waste paper to remove at least a portion of liquids and solubilized organics from the separated substantially re-pulped waste paper.

23. The method of claim 22, wherein the dewatered substantially re-pulped waste paper comprises cellulosic materials in an amount greater than about 30% of the dewatered substantially re-pulped waste paper.

24. The method of claim 22, wherein the dewatered substantially re-pulped waste paper is characterized by a biochemical oxygen demand (BOD) content of less than about 50 lb/t of dry fiber.

25. The method of claim 22, wherein the dewatered substantially re-pulped waste paper is characterized by a biochemical oxygen demand (BOD) content that is less than about 50% of the BOD content of the untreated waste material.

26. The method of claim 22, wherein the filtrate removed during dewatering the substantially re-pulped waste paper comprises less than about 0.2% by weight suspended solids and about 90% of the soluble biochemical oxygen demand (BOD) as the substantially re-pulped waste paper.

27. The method of claim 22, further comprising treating at least a portion of the liquids and solubilized organics removed from the substantially re-pulped waste paper in an anaerobic digester to produce a biogas.

28. The method of claim 27, further comprising converting the biogas to energy.

29. The method of claim 1, further comprising preparing a post-consumer paper-containing product comprising the substantially re-pulped waste paper.

30. The method of claim 29, wherein the post-consumer paper-containing product comprises a paperboard product, an absorbent paper product, a tissue paper product, a paper towel product, a newsprint paper product, a cardboard product, or a combination thereof.

31. The method of claim 1, further comprising converting at least a portion of the substantially re-pulped waste paper to one or more furaldehydes, organic acids, organic acid degradation products, or combinations thereof.

32. The method of claim 31, wherein converting the substantially re-pulped waste paper comprises hydrolyzing cellulose present in the substantially re-pulped waste paper to glucose, and thereafter converting the glucose to one or more furaldehydes, organic acids, organic acid degradation products, or combinations thereof.

33. The method of claim 1, wherein the method is performed on-site at a pulp and/or paper mill, the method further comprising:
  separating the substantially re-pulped waste paper from a majority of any non-cellulosic solids in the first portion;
  mechanically dewatering the separated substantially re-pulped waste paper to remove at least a portion of liquids and solubilized organics;
  preparing a post-consumer paper-containing product comprising at least a portion of the dewatered substantially re-pulped waste paper; and
  treating at least a portion of the liquids and solubilized organics in an anaerobic digester to produce a biogas for energy.

34. The method of claim 1, wherein the method is performed on-site at a pulp and paper mill, the method further comprising:
  separating the substantially re-pulped waste paper from a majority of any non-cellulosic solids in the first portion; and
  either preparing a post-consumer paper-containing product comprising at least a portion of the substantially re-pulped waste paper; converting at least a portion of the separated substantially re-pulped waste paper to one or more furaldehydes, organic acids, organic acid degradation products, or combinations thereof; or combinations thereof.

35. The method of claim 1, further comprising:
  separating the substantially re-pulped waste paper from a majority of any non-cellulosic solids in the first portion;
  separating the substantially fiber-free recoverable/recyclable plastics in the second portion; and
  either converting the substantially fiber-free recoverable/recyclable plastics to a refuse derived fuel having an energy value of greater than about 5,000 BTU; pyrolyzing the separated substantially fiber-free recoverable/recyclable plastics to produce one or more products suitable for use as a fuel; optically sorting polyethylene terephthalate (PET) from the substantially fiber-free recoverable/recyclable plastics and shredding the PET to form PET flakes; or combinations thereof.

36. The method of claim 35, wherein the method is performed on-site at a pulp and/or paper mill.

37. The method of claim 1, wherein the method is performed on-site at a pulp and/or paper mill, the method further comprising:
  separating the substantially re-pulped waste paper from a majority of any non-cellulosic solids in the first portion;
  separating the substantially fiber-free recoverable/recyclable plastics in the second portion; and
  mechanically dewatering the separated substantially re-pulped waste paper to remove at least a portion of liquids and solubilized organics;
  either preparing a post-consumer paper-containing product comprising at least a portion of the substantially re-pulped waste paper; converting at least a portion of the separated substantially re-pulped waste paper to one or more organic acids, organic acid degradation products, or combinations thereof; or combinations thereof;
  either converting the substantially fiber-free recoverable/recyclable plastics to a refuse derived fuel having an energy value of greater than about 5,000 BTU; pyrolyzing the separated substantially fiber-free recoverable/recyclable plastics to produce one or more products suitable for use as a fuel; optically sorting polyethylene terephthalate (PET) from the substantially fiber-free recoverable/recyclable plastics and shredding the PET to form PET flakes; or combinations thereof; and
  treating at least a portion of the liquids and solubilized organics in an anaerobic digester to produce a biogas for energy.

* * * * *